(12) United States Patent
Maeda et al.

(10) Patent No.: US 10,185,213 B2
(45) Date of Patent: Jan. 22, 2019

(54) FLUORESCENT SUBSTRATE, LIGHT SOURCE DEVICE, AND PROJECTION DISPLAY UNIT

(71) Applicant: SONY CORPORATION, Tokyo (JP)

(72) Inventors: Yuki Maeda, Kanagawa (JP); Yoshiro Asano, Kanagawa (JP); Masa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/569,499

(22) PCT Filed: Apr. 20, 2016

(86) PCT No.: PCT/JP2016/062495
§ 371 (c)(1),
(2) Date: Oct. 26, 2017

(87) PCT Pub. No.: WO2016/185860
PCT Pub. Date: Nov. 24, 2016

(65) Prior Publication Data
US 2018/0299756 A1 Oct. 18, 2018

(30) Foreign Application Priority Data
May 15, 2015 (JP) .................................. 2015-099923

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC ..... F21K 9/60; F21K 9/64; F21V 1/17; F21V 3/08; F21V 3/12; F21V 5/10; F21V 7/26;
(Continued)

(56) References Cited

U.S. PATENT DOCUMENTS

| 2006/0028746 A1 | 2/2006 | Niwa et al. |
| 2006/0238909 A1 | 10/2006 | Auell |

(Continued)

FOREIGN PATENT DOCUMENTS

| AT | 436038 T | 7/2009 |
| CN | 101164003 A | 4/2008 |

(Continued)

OTHER PUBLICATIONS

International Search Report and Written Opinion of PCT Application No. PCT/JP2016/062495, dated Jun. 21, 2016, 09 pages of ISRWO.

*Primary Examiner* — Joseph L Williams
*Assistant Examiner* — Jose M Diaz
(74) *Attorney, Agent, or Firm* — Chip Law Group

(57) ABSTRACT

A fluorescent substrate according to one embodiment of the present disclosure includes: a substrate that is configured in a rotatable manner; a fluorescent layer disposed in a center of the substrate; and a fixing layer that fixes a portion of a surface on side on which the fluorescent layer is located of the substrate and a portion of a surface on side on which the substrate is located of the fluorescent layer to each other. Thus, in a case where warpage occurs in the substrate due to a stress caused by thermal expansion arising in each of the fluorescent layer and the substrate, it is possible to reduce an amount of displacement of the fluorescent layer.

13 Claims, 14 Drawing Sheets

(58) Field of Classification Search
CPC ..... F21V 7/30; F21V 9/02; F21V 9/06; F21V 9/08; F21V 9/30; F21V 9/32; F21V 9/35; F21V 9/38; F21V 9/40; F21V 9/45; F21V 13/08; F21V 13/14; G02F 2001/133614; G03B 21/204; G02B 26/008
See application file for complete search history.

(56) References Cited

U.S. PATENT DOCUMENTS

| | | | |
|---|---|---|---|
| 2011/0149549 A1* | 6/2011 | Miyake | F21V 7/22 |
| | | | 362/84 |
| 2013/0026527 A1 | 1/2013 | Ichikawa | |
| 2016/0091712 A1* | 3/2016 | Egawa | G03B 21/204 |
| | | | 353/31 |
| 2016/0139401 A1 | 5/2016 | Cheng et al. | |

FOREIGN PATENT DOCUMENTS

| | | |
|---|---|---|
| CN | 102823000 A | 12/2012 |
| EP | 1872166 A1 | 1/2008 |
| EP | 2557607 A1 | 2/2013 |
| JP | 2006-047836 A | 2/2006 |
| JP | 2006-323117 A | 11/2006 |
| JP | 2011-129354 A | 6/2011 |
| JP | 2011-129354 A1 | 6/2011 |
| JP | 2013-122606 A | 6/2013 |
| JP | 2013-130605 A | 7/2013 |
| KR | 10-2008-0003341 A | 1/2008 |
| KR | 10-2013-0029387 A | 3/2013 |
| RU | 2012147484 A | 5/2014 |
| TW | 201205897 A | 2/2012 |
| WO | 2006/111036 A1 | 10/2006 |
| WO | 2011/126000 A1 | 10/2011 |

\* cited by examiner

[FIG. 2]
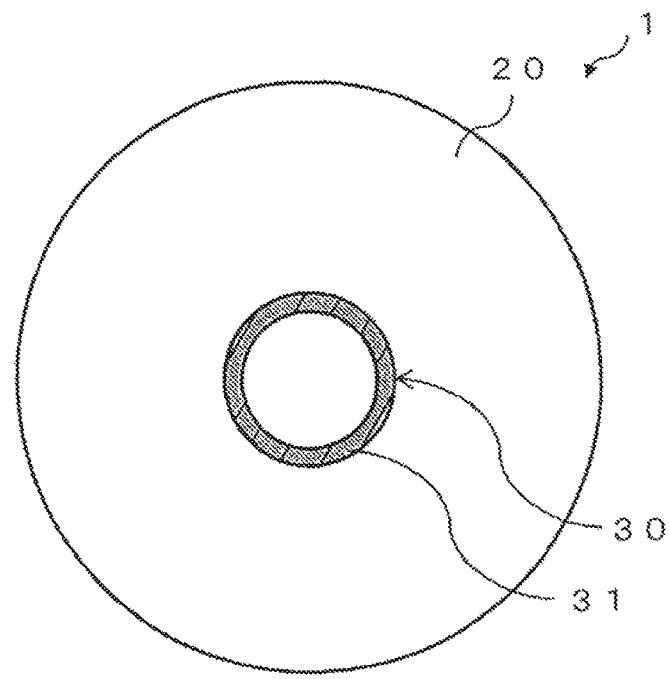
[FIG. 3]
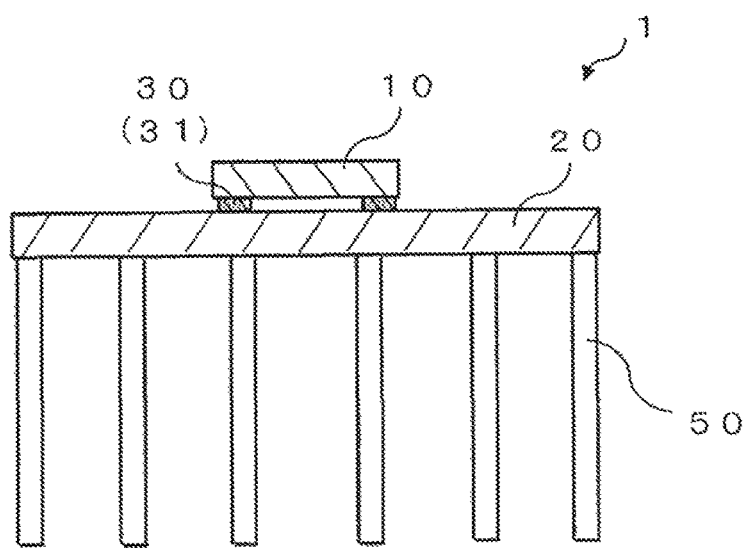

[ FIG. 4 ]
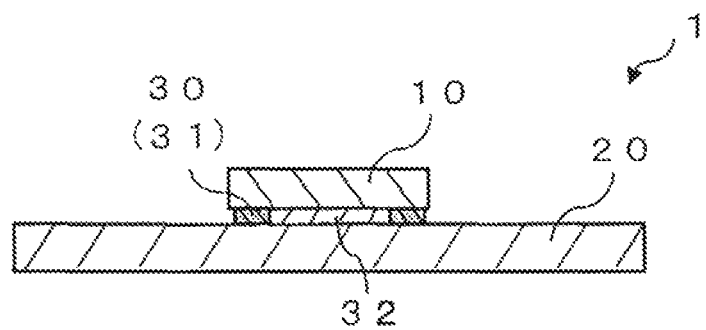
[ FIG. 5 ]
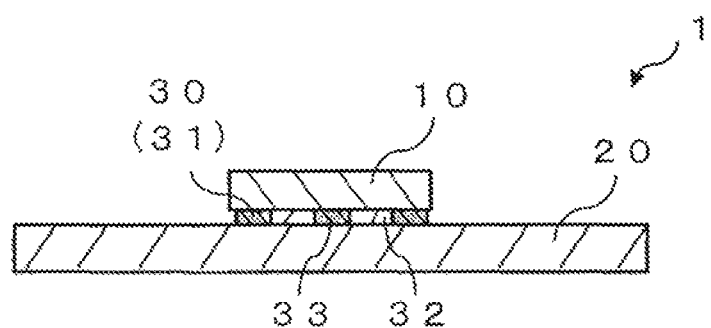

[ FIG. 7 ]
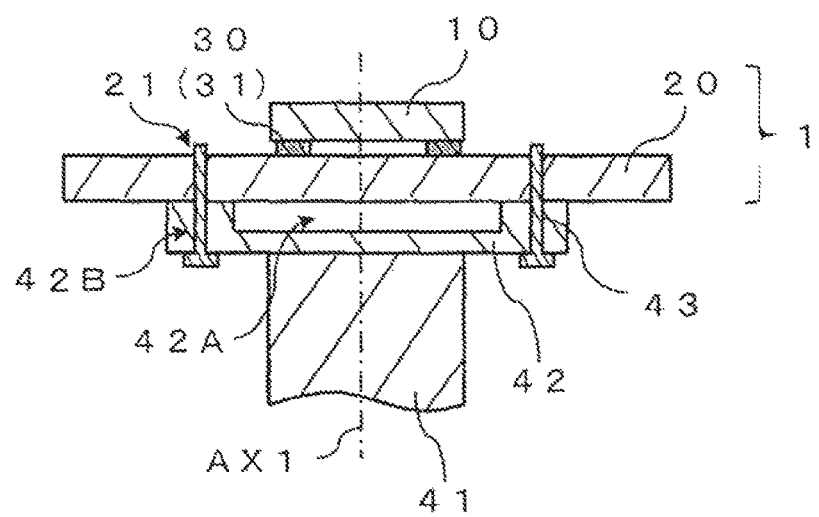

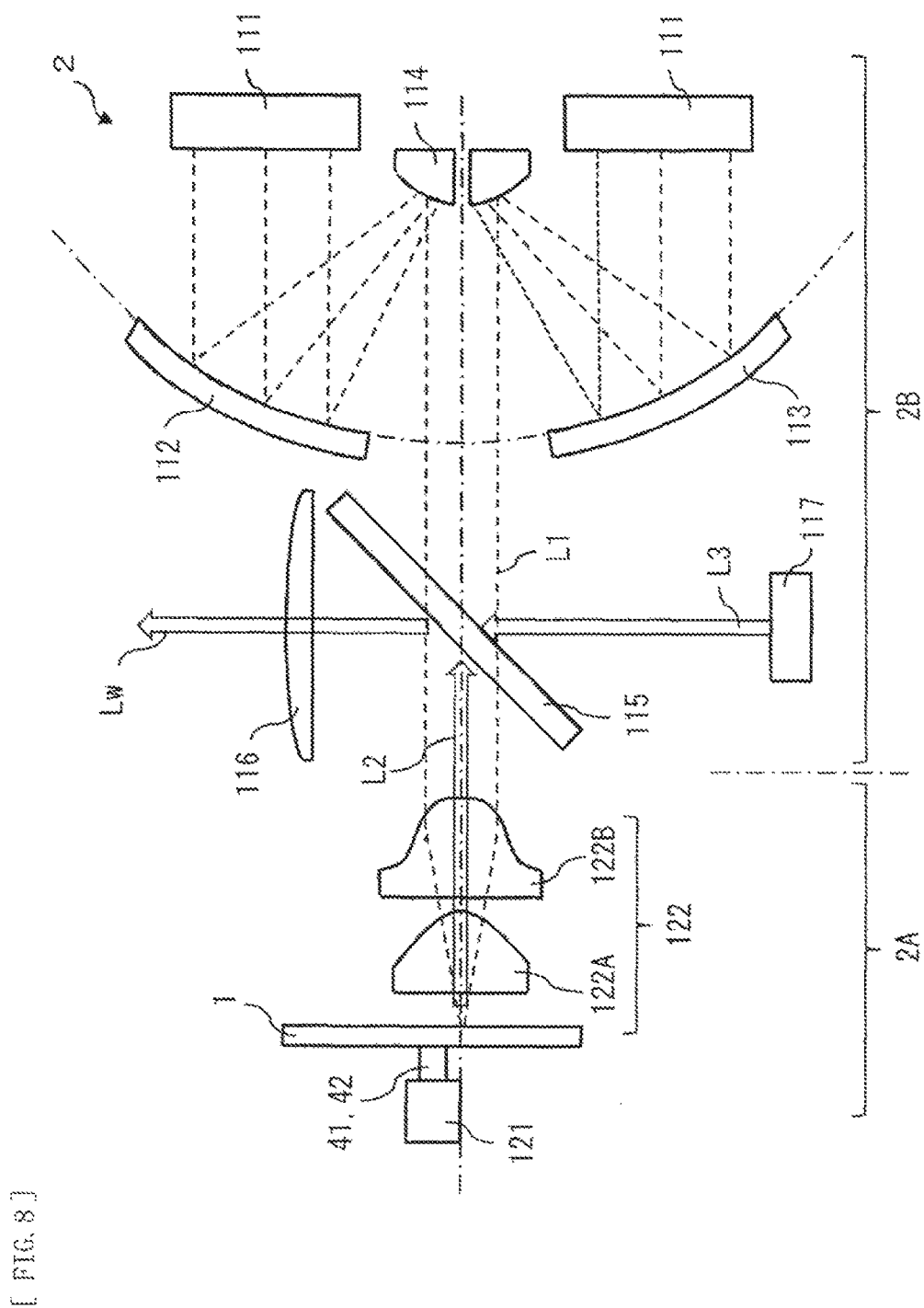
[FIG. 8]

[FIG. 9]
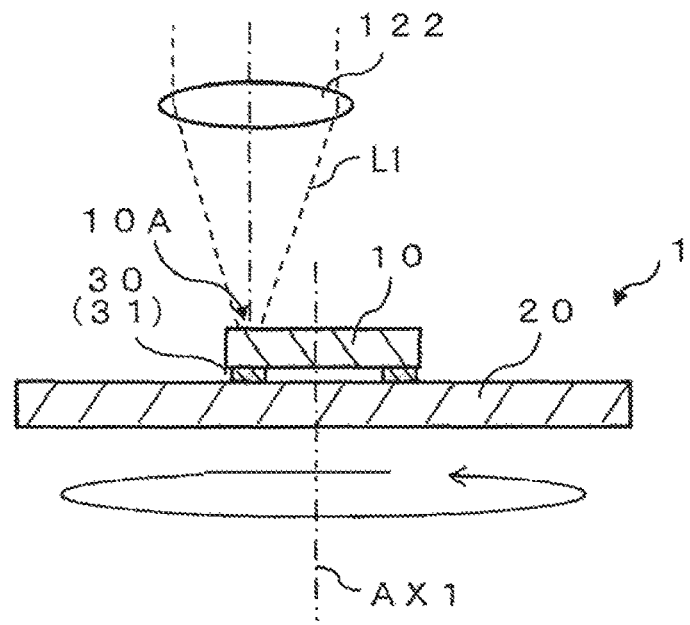
[FIG. 10]
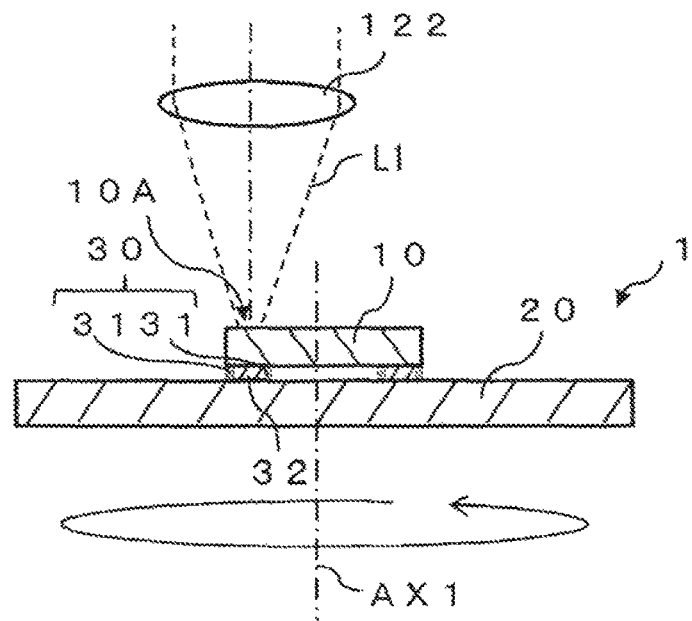

[FIG. 11]
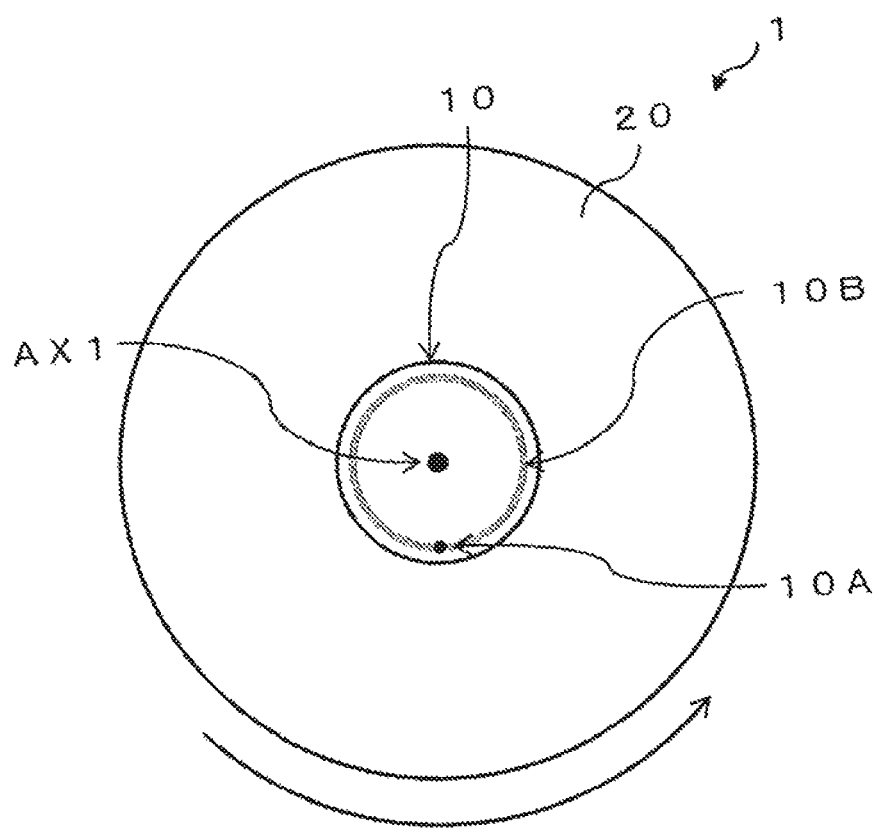

[ FIG. 13 ]
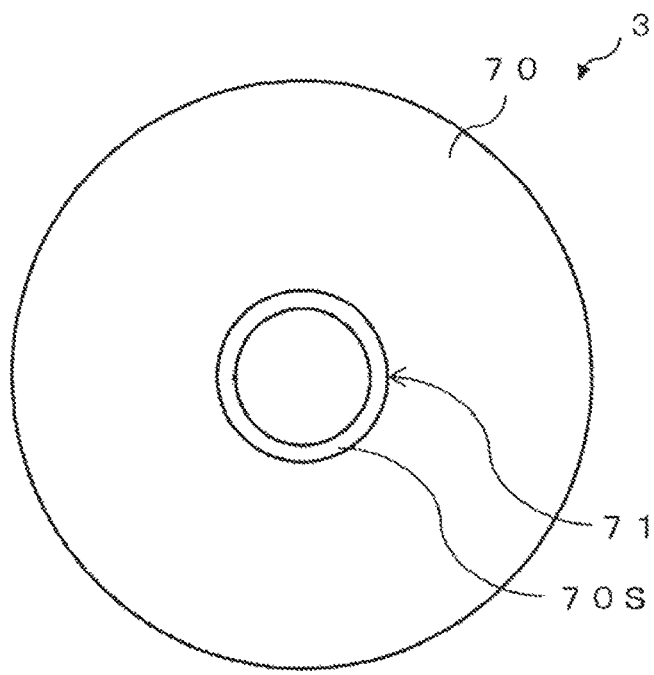
[ FIG. 14 ]
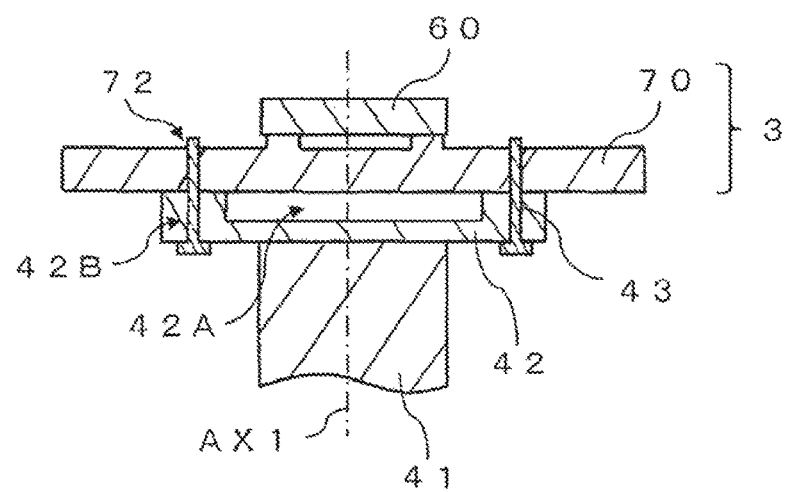

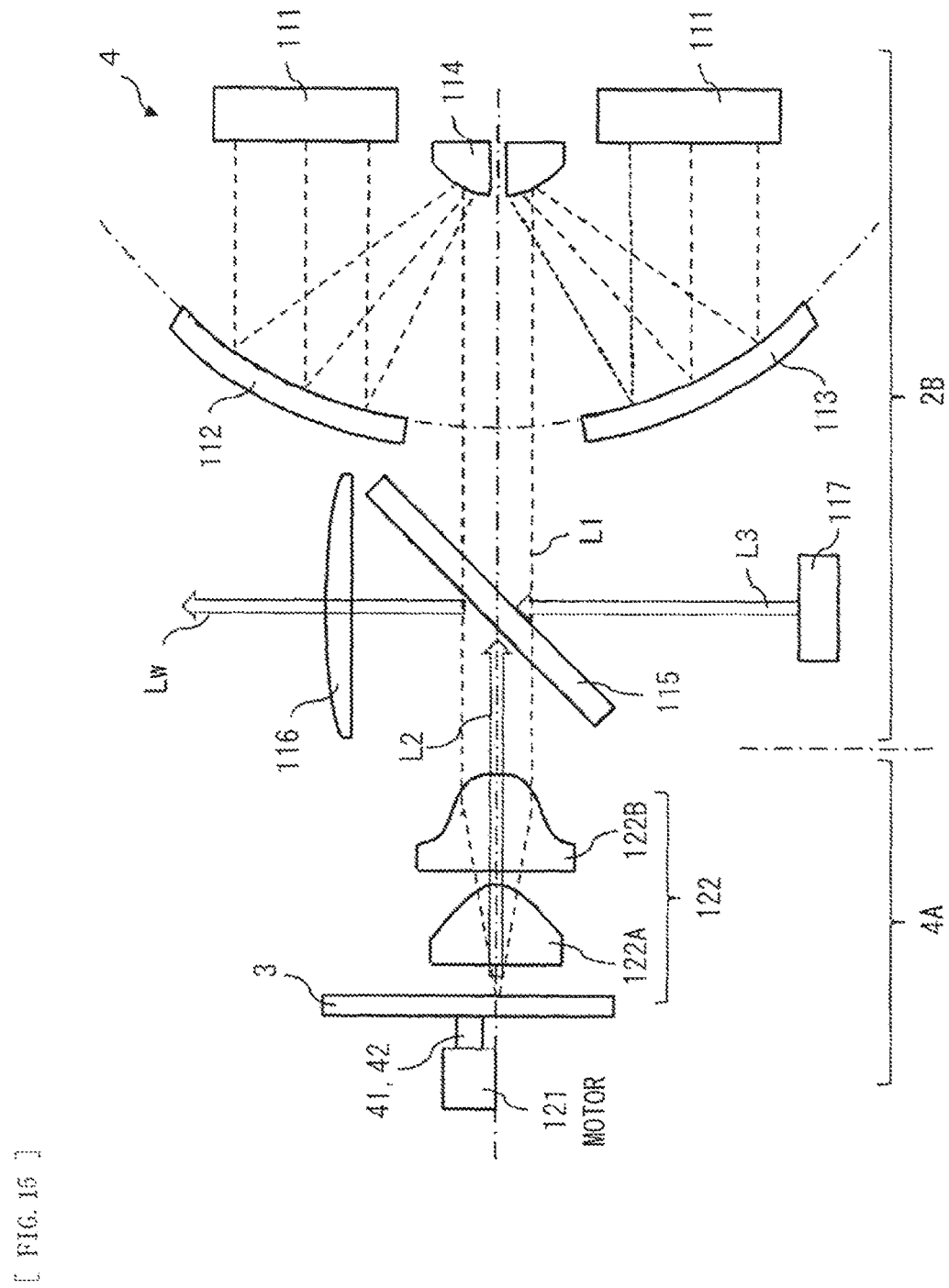
[FIG. 15]

[ FIG. 16 ]
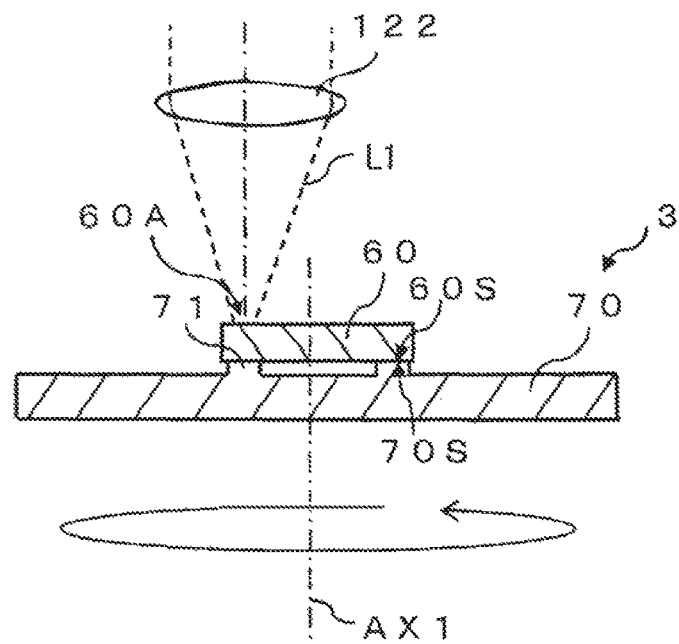
[ FIG. 17 ]
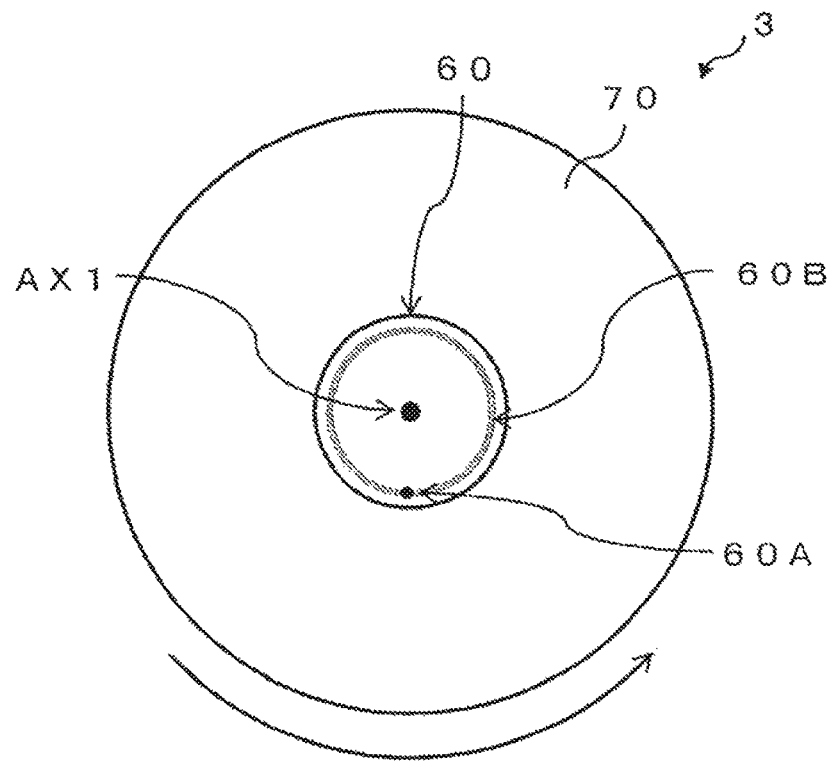

FLUORESCENT SUBSTRATE, LIGHT SOURCE DEVICE, AND PROJECTION DISPLAY UNIT

CROSS REFERENCE TO RELATED APPLICATIONS

This application is a U.S. National Phase of International Patent Application No. PCT/JP2016/062495 filed on Apr. 20, 2016, which claims priority benefit of Japanese Patent Application No. JP 2015-099923 filed in the Japan Patent Office on May 15, 2015. Each of the above-referenced applications is hereby incorporated herein by reference in its entirety.

TECHNICAL FIELD

The present disclosure relates to a fluorescent substrate, a light source device, and a projection display unit.

BACKGROUND ART

As a light source to be used for a projection display unit such as a projector, a solid-state light source having a long operating life and a wide color gamut has drawn the attention. In recent years, a light source device that utilizes light emitted from a fluorescent body by irradiation of the fluorescent body with light from the solid-state light source has been made available for the projector or any other equivalent display apparatus.

The above-described light source device includes, for example, a fluorescent layer, and a solid-state light source that irradiates the fluorescent layer with excitation light. A phenomenon called luminance saturation or temperature quenching is present in light emission of the fluorescent layer. This is the phenomenon in which a portion of conversion loss in the fluorescent layer is changed into heat to cause the fluorescent layer to produce heat in a case where an output of the excitation light is raised, resulting in deterioration in the fluorescence conversion efficiency. In a state of the low fluorescence conversion efficiency, it is not possible to achieve a bright and efficient light source device. Therefore, the fluorescent layer is provided on a surface of a substrate having high thermal conductivity.

CITATION LIST

Patent Literature

[PTL 1] Japanese Unexamined Patent Application Publication No. 2013-130605

SUMMARY OF THE INVENTION

Meanwhile, the fluorescent layer and the substrate on which the fluorescent layer is provided may be fixed to each other with an adhesive layer or any other adhesive material in between, or may be directly fixed to each other using normal-temperature bonding, optical contact, or any other equivalent technique. Consequently, warpage occurs in the substrate due to a stress caused by thermal expansion arising in each of the fluorescent layer and the substrate, leading to displacement of a focal position. As a result, this poses an issue of deterioration in the fluorescence conversion efficiency. Such an issue may also occur in the invention mentioned in PTL 1 in which a thin film is provided on a surface of a ceramic fluorescent body to maintain the uniform temperature distribution of the ceramic fluorescent body.

Accordingly, it is desirable to provide a fluorescent substrate, a light source device, and a projection display unit that make it possible to reduce the displacement of the focal position caused by the thermal expansion.

A fluorescent substrate according to a first embodiment of the present disclosure includes: a substrate that is configured in a rotatable manner; a fluorescent layer disposed in a center of the substrate; and a fixing layer that fixes a portion of a surface on side on which the fluorescent layer is located of the substrate and a portion of a surface on side on which the substrate is located of the fluorescent layer to each other.

A light source device according to the first embodiment of the present disclosure includes: a substrate that is configured in a rotatable manner; a fluorescent layer disposed in a center of the substrate; a fixing layer that fixes a portion of a surface on side on which the fluorescent layer is located of the substrate and a portion of a surface on side on which the substrate is located of the fluorescent layer to each other; and a light source that irradiates the fluorescent layer with excitation light.

A projection display unit according to the first embodiment of the present disclosure includes: a substrate that is configured in a rotatable manner; a fluorescent layer disposed in a center of the substrate; a fixing layer that fixes a portion of a surface on side on which the fluorescent layer is located of the substrate and a portion of a surface on side on which the substrate is located of the fluorescent layer to each other; and a light source that irradiates the fluorescent layer with excitation light. The projection display unit further includes: a light modulator that generates image light by modulating the excitation light emitted from the light source on a basis of an image signal; and a projector that projects the image light generated by the light modulator.

In the fluorescent substrate, the light source device, and the projection display unit according to the first embodiment of the present disclosure, the fluorescent layer is disposed in the center of the substrate. Thus, in a case where warpage occurs in the substrate due to a stress caused by thermal expansion arising in each of the fluorescent layer and the substrate, it is possible to reduce an amount of displacement of the fluorescent layer as compared with a case where the fluorescent layer is disposed on an outer edge of the substrate or over the entire surface of the substrate. Further, in the present disclosure, the portion of the surface on the side on which the fluorescent layer is located of the substrate and the portion of the surface on the side on which the substrate is located of the fluorescent layer are fixed to each other by the fixing layer. This makes it possible to reduce the amount of displacement of the fluorescent layer as compared with a case where the entire surface on the side on which the fluorescent layer is located of the substrate and the entire surface on the side on which the substrate is located of the fluorescent layer are fixed to each other by the fixing layer.

A fluorescent substrate according to a second embodiment of the present disclosure includes: a substrate; and a fluorescent layer disposed in a center of the substrate. The substrate has a junction surface that joins a portion of a surface on side on which the fluorescent layer is located of the substrate and a portion of a surface on side on which the substrate is located of the fluorescent layer with each other.

A light source device according to the second embodiment of the present disclosure includes: a substrate; a fluorescent layer disposed in a center of the substrate; and a light source that irradiates the fluorescent layer with excitation light. The substrate has a junction surface that joins a portion of a surface on side on which the fluorescent layer is located of the substrate and a portion of a surface on side on which the substrate is located of the fluorescent layer with each other.

A projection display unit according to the second embodiment of the present disclosure includes: a substrate; a fluorescent layer disposed in a center of the substrate; and a light source that irradiates the fluorescent layer with excitation light. The projection display unit further includes: a light modulator that generates image light by modulating the excitation light emitted from the light source on a basis of an image signal; and a projector that projects the image light generated by the light modulator. The substrate has a junction surface that joins a portion of a surface on side on which the fluorescent layer is located of the substrate and a portion of a surface on side on which the substrate is located of the fluorescent layer with each other.

In the fluorescent substrate, the light source device, and the projection display unit according to the second embodiment of the present disclosure, the fluorescent layer is disposed in the center of the substrate. Thus, in a case where warpage occurs in the substrate due to a stress caused by thermal expansion arising in each of the fluorescent layer and the substrate, it is possible to reduce an amount of displacement of the fluorescent layer as compared with a case where the fluorescent layer is disposed on an outer edge of the substrate or over the entire surface of the substrate. Further, in the present disclosure, the substrate is provided with the junction surface that joins the portion of the surface on the side on which the fluorescent layer is located of the substrate and the portion of the surface on the side on which the substrate is located of the fluorescent layer with each other. This makes it possible to reduce the amount of displacement of the fluorescent layer as compared with a case where the entire surface on the side on which the fluorescent layer is located of the substrate and the entire surface on the side on which the substrate is located of the fluorescent layer are joined with each other.

According to the fluorescent substrate, the light source device, and the projection display unit of the first embodiment of the present disclosure, it is possible to reduce the amount of displacement of the fluorescent layer that is caused by a stress due to thermal expansion, which makes it possible to reduce displacement of a focal position due to the thermal expansion. It is to be noted that an effect described above is illustrative and not necessarily limited. An effect to be achieved by an embodiment of the present disclosure may be any of effects described in the present disclosure.

According to the fluorescent substrate, the light source device, and the projection display unit of the second embodiment of the present disclosure, it is possible to reduce the amount of displacement of the fluorescent layer that is caused by a stress due to thermal expansion, which makes it possible to reduce displacement of a focal position due to the thermal expansion. It is to be noted that an effect described above is illustrative and not necessarily limited. An effect to be achieved by an embodiment of the present disclosure may be any of effects described in the present disclosure.

BRIEF DESCRIPTION OF DRAWINGS

FIG. 2 is a diagram illustrating an example of a cross-sectional configuration, cut at a location of a fixing layer, of the fluorescent substrate illustrated in FIGS. 1(A) and 1(B).

FIG. 3 is a diagram illustrating one modification example of a cross-sectional configuration of the fluorescent substrate illustrated in FIGS. 1(A) and 1(B).

FIG. 4 is a diagram illustrating one modification example of a cross-sectional configuration of the fluorescent substrate illustrated in FIGS. 1(A) and 1(B).

FIG. 5 is a diagram illustrating one modification example of a cross-sectional configuration of the fluorescent substrate illustrated in FIGS. 1(A) and 1(B).

FIG. 7 is a diagram illustrating a cross-sectional configuration example in a case where a shaft of a motor is mounted on the fluorescent substrate illustrated in FIGS. 1(A) and 1(B) with an attachment in between.

FIG. 8 is a diagram illustrating a simplified configuration example of a light source device using any of the fluorescent substrates illustrated in FIGS. 1(A), 1(B), 2, 3, 4, 5, 6(A) and 6(B).

FIG. 9 is a diagram for describing one example of irradiation of the fluorescent substrate with excitation light in the light source device illustrated in FIG. 8.

FIG. 10 is a diagram for describing one example of irradiation of the fluorescent substrate with the excitation light in the light source device illustrated in FIG. 8.

FIG. 11 is a diagram for describing one example of irradiation of the fluorescent substrate with the excitation light in the light source device illustrated in FIG. 8.

FIG. 13 is a diagram illustrating one example of a planar configuration of the substrate illustrated in FIGS. 12(A) and 12(B).

FIG. 14 is a diagram illustrating a cross-sectional configuration example in a case where a shaft of a motor is mounted on the fluorescent substrate illustrated in FIGS. 12(A) and 12(B) with an attachment in between.

FIG. 15 is a diagram illustrating a simplified configuration example of a light source device using the fluorescent substrates illustrated in FIGS. 12(A) and 12(B).

FIG. 16 is a diagram for explaining one example of irradiation of the fluorescent substrate with the excitation light in the light source device illustrated in FIG. 15.

FIG. 17 is a diagram for explaining one example of irradiation of the fluorescent substrate with the excitation light in the light source device illustrated in FIG. 15.

MODES FOR CARRYING OUT THE INVENTION

Figure 1A:
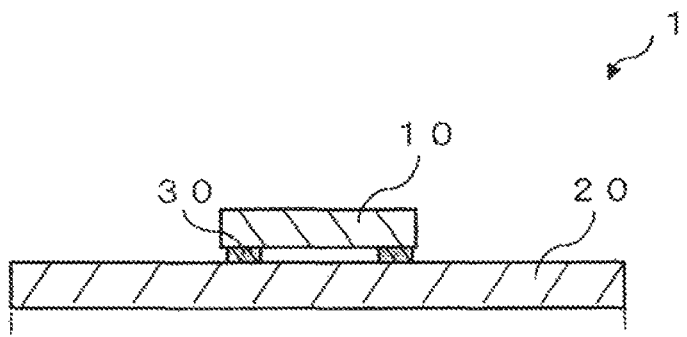
FIGS. 1(A) and 1(B) are diagrams illustrating a cross-sectional configuration example and a planar configuration example of a fluorescent substrate according to a first embodiment of the present disclosure.

Hereinafter, some embodiments of the present disclosure are described in detail with reference to the drawings. The following description is directed to illustrative examples of the invention and not to be construed as limiting to the invention. Further, factors including, without limitation, positions, dimensions, dimension ratios of components in the drawings are illustrative only and not to be construed as limiting to the invention. It is to be noted that description is given in the following order.

1. First Embodiment (a fluorescent substrate and a light source device)
2. Second Embodiment (a fluorescent substrate and a light source device)
3. Modification Example of Second Embodiment (a fluorescent substrate)
4. Third Embodiment (a projection display unit)

1. First Embodiment

[Configuration]

Figure 1B:
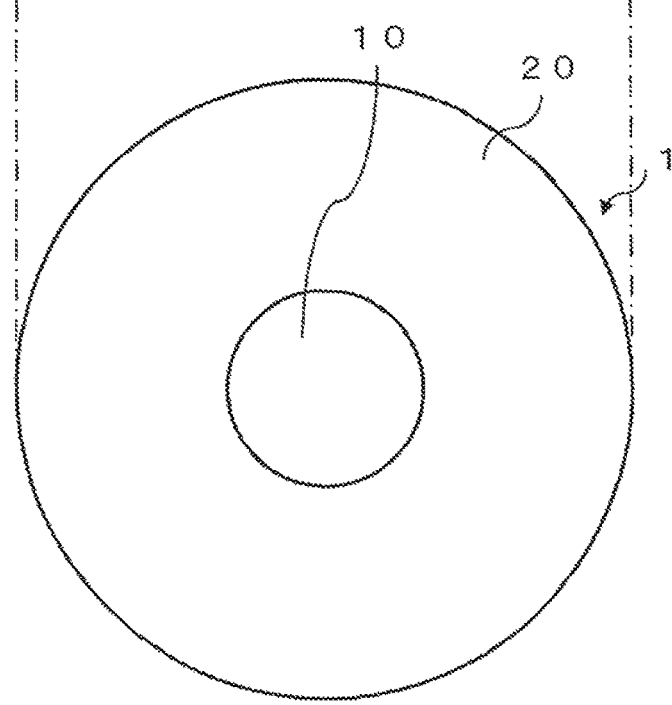

Description is given of a configuration of a fluorescent substrate 1 according to a first embodiment of the present disclosure. The fluorescent substrate 1 corresponds to a specific example of a "fluorescent substrate" in the present disclosure. FIGS. 1(A) and 1(B) illustrate a cross-sectional configuration example and a planar configuration example of the fluorescent substrate 1 according to the first embodiment of the present disclosure. The fluorescent substrate 1 is applicable to, for example, a light converter 2A of a light source device 2 to be described later (see FIG. 8). The fluorescent substrate 1 includes a substrate 20 and a fluorescent layer 10.

The substrate 20 is configured in a rotatable manner, and is rotationally symmetric, for example. In a case where the substrate 20 is mounted on a shaft 41 with an attachment 42 to be described later in between, the substrate 20 is, for example, in a shape rotationally symmetric about a rotation axis AX1 of the shaft 41 to be described later. For example, as illustrated in FIG. 1(B), the substrate 20 is in a circular disk shape. The substrate 20 includes a material having high thermal conductivity, and includes, for example, any of materials such as a metal/alloy-based material, a ceramic-based material, a ceramic/metal mixture-based material, crystals including sapphire, diamond, and glass. Here, examples of the metal/alloy-based material include Al, Cu, Mo, W, and CuW. Examples of the ceramic-based material include SiC, AlN, Al2O3, Si3N4, ZrO2, and Y2O3. Examples of the ceramic/metal mixture-based material include SiC—Al, SiC—Mg, and SiC—Si.

A diameter of the substrate 20 is, for example, at least 20 mm but no more than 100 mm. A thickness of the substrate 20 is, for example, at least 0.3 mm but no more than 2.0 mm. The substrate 20 may be configured in a single layer, or may be configured in a plurality of layers. In a case where the substrate 20 is configured in the single layer, the substrate 20 preferably includes a material having high reflectance. In a case where the substrate 20 is configured in the plurality of layers, a layer that configures a top surface of the substrate 20 preferably includes a material having high reflectance.

The fluorescent layer 10 is disposed in a center of the substrate 20. For example, as illustrated in FIG. 1(B), the fluorescent layer 10 is in a circular disk shape, and is disposed in a concentric manner with the substrate 10. At the time of entry of light of a specified wavelength, the fluorescent layer 10 is excited by the light of the specified wavelength (incident light) to emit light in a wavelength region that is different from the wavelength of the incident light. The fluorescent layer 10 includes, for example, a fluorescent material that is excited by blue light having a center wavelength of about 445 nm to emit yellow fluorescent light (yellow light). For example, at the time of entry of the blue light, the fluorescent layer 10 converts a portion of the blue light into the yellow light. Examples of the fluorescent material contained in the fluorescent layer 10 include a YAG-based fluorescent body (for example, Y3Al5O12). The YAG-based fluorescent body is one of the fluorescent materials that are excited by the blue light having the center wavelength of about 445 nm to emit the yellow fluorescent light (the yellow light). In a case where the fluorescent material contained in the fluorescent layer 10 is the YAG-based fluorescent body, the YAG-based fluorescent body may be doped with Ce.

The fluorescent layer 10 may include an oxide fluorescent body other than the YAG-based fluorescent body. As an alternative, the fluorescent layer 10 may include a fluorescent body other than the oxide fluorescent body, and may include, for example, an oxynitride fluorescent body, a nitride-based fluorescent body, a sulfide fluorescent body, or a silicate-based fluorescent body. Here, examples of the oxynitride fluorescent body include a BSON fluorescent body (for example, $Ba_3Si_6O_{12}N_2$: $Eu^{2+}$). Examples of the nitride-based fluorescent body include a CASN fluorescent body (for example, $CaAlSiN_3$: Eu) or a SiAlON fluorescent body. Examples of the sulfide fluorescent body include an SGS fluorescent body (for example, $SrGa_2S_4$: Eu). Examples of the silicate-based fluorescent body include a TEOS fluorescent body (for example, Si $(OC_2H_5)_4$).

The fluorescent layer 10 includes a particulate fluorescent body and a binder that holds the particulate fluorescent body. The fluorescent layer 10 may include, for example, the particulate fluorescent body and a material that is formed by solidifying the particulate fluorescent body with an inorganic material. The fluorescent layer 10 may be formed, for example, by applying, onto the substrate 20, a material containing the particulate fluorescent body and the binder that holds the particulate fluorescent body. The fluorescent layer 10 may be formed, for example, by sintering a material containing the particulate fluorescent body and the binder (for example, a ceramic material) that holds the particulate fluorescent body. It is to be noted that the particulate fluorescent body contained in the fluorescent layer 10 is, for example, any of the various fluorescent bodies as described above. The fluorescent layer 10 may be a polycrystalline plate including a fluorescent material. The polycrystalline plate is formed by processing a polycrystalline material including the fluorescent material in a plate-like shape.

The substrate 20 and the fluorescent layer 10 preferably include materials ensuring that a difference in a linear expansion coefficient between the substrate 20 and the fluorescent layer 10 is equal to or less than $1 \times 10^{-6}$ cm/degree centigrade per meter. In a case where the fluorescent layer 10 is the polycrystalline plate including the Ce-doped YAG-based fluorescent body, the linear expansion coefficient of the fluorescent layer 10 is about $8.0 \times 10^{-6}$ m/degree centigrade per meter. In a case where the substrate 20 includes a titanium alloy, the linear expansion coefficient of the substrate 20 is about $8.4 \times 10^{-6}$ m/degree centigrade per meter. Therefore, in a case where the fluorescent layer 10 is the polycrystalline plate including the Ce-doped YAG-based fluorescent body, and the substrate 20 includes the titanium alloy, the difference in the linear expansion coefficient between the substrate 20 and the fluorescent layer 10 is $0.4 \times 10^{-6}$ cm/degree centigrade per meter. That is, in a case where the fluorescent layer 10 is the polycrystalline plate includes a ceramic material, and the substrate 20 includes the titanium alloy, the difference in the linear expansion coefficient between the substrate 20 and the fluorescent layer 10 is equal to or less than $1\times10^{-6}$ cm/degree centigrade per meter.

The substrate 20 may include a material having a large linear expansion coefficient, such as aluminum ($23\times10^{-6}$ cm/degree centigrade per meter), stainless steel ($17\times10^{-6}$ cm/degree centigrade per meter), or copper ($17\times10^{-6}$ cm/degree centigrade per meter), for example. In this case, however, the difference in the linear expansion coefficient between the substrate 20 and the fluorescent layer 10 is a significantly greater value than $1\times10^{-6}$ cm/degree centigrade per meter.

For example, it is assumed that the fluorescent layer 10 includes the ceramic material, and the substrate 20 includes aluminum. Further, for example, it is assumed that a diameter of the fluorescent layer 10 is 20 mm, and temperatures of the fluorescent layer 10 and the substrate 20 are respectively 200 degrees centigrade and 150 degrees centigrade at a room temperature of 20 degrees centigrade. An expansion amount of each of the fluorescent layer 10 and the substrate 20 at this time is as follows:
Fluorescent layer 10: 14.4 mm
Substrate 20: 29.9 mm
As a result, a difference in the expansion amount is about 15.5 mm.

Meanwhile, for example, it is assumed that the fluorescent layer 10 includes the ceramic material, and the substrate 20 includes the titanium alloy. Further, for example, it is assumed that the diameter of the fluorescent layer 10 is 20 mm, and the temperatures of the fluorescent layer 10 and the substrate 20 are respectively 200 degrees centigrade and 150 degrees centigrade at a room temperature of 20 degrees centigrade. The expansion amount of each of the fluorescent layer 10 and the substrate 20 at this time is as follows:
Fluorescent layer 10: 14.4 mm
Substrate 20: 10.9 mm
As a result, the difference in the expansion amount is about 3.5 mm, that is, the difference is reduced to one fifth of the above-described expansion amount.

A diameter of the fluorescent layer 10 is, for example, at least 3 mm but no more than 60 mm. In a case where the diameter of the substrate 20 is 20 mm, the diameter of the fluorescent layer 10 is, for example, 3 mm. In a case where the diameter of the substrate 20 is 100 mm, the diameter of the fluorescent layer 10 is, for example, 60 mm. The fluorescent layer 10 may be configured in a single layer, or may be configured in a plurality of layers. In a case where the fluorescent layer 10 is configured in the plurality of layers, a layer that configures a surface (an undersurface) of the fluorescent layer 10 on the side on which the substrate 20 is located may include a material having high reflectance.

For example, the fluorescent substrate 1 further includes a fixing layer 30 that fixes the substrate 20 and the fluorescent layer 10 to each other between the substrate 20 and the fluorescent layer 10, as illustrated in FIGS. 1(A), 1(B), and 2. The fixing layer 30 corresponds to a specific example of a "fixing layer" in the present disclosure. The fixing layer 30 fixes a portion of a surface on the side on which the fluorescent layer 10 is located of the substrate 20 and a portion of a surface on the side on which the substrate 20 is located of the fluorescent layer 10 to each other. In a case where each of the substrate 20 and the fluorescent layer 10 is in a circular disk shape, the fixing layer 30 is in a ring-like shape, and is provided at a position facing an outer edge of the fluorescent layer 10.

The fixing layer 30 includes, for example, an organic adhesive material, an inorganic adhesive material, a low-melting-point glass, or a solder. Examples of the organic adhesive material to be used for the fixing layer 30 include an acrylic resin, an epoxy resin, a silicone resin, or a fluorine resin. Examples of the inorganic adhesive material to be used for the fixing layer 30 include a silica adhesive agent, an alumina adhesive agent, or a ceramic-based adhesive agent. Examples of the low-melting-point glass include a fritted glass or a silicate glass.

For example, the fluorescent substrate 1 may further include a heat dissipator 50 that includes a material having relatively high thermal conductivity on a rear surface of the substrate 20 (on a surface of the substrate 20 on the opposite side of the fluorescent layer 10), as illustrated in FIG. 3. The heat dissipator 50 is configured with use of, for example, a plurality of fins extending in a predetermined direction. The fins each include a lightweight metal having relatively high thermal conductivity, such as aluminum, for example.

For example, the fixing layer 30 may have one ring-like convex section 31 at a position facing the outer edge of the fluorescent layer 10, as illustrated in FIGS. 1(A), 1(B), and 2. At this time, the ring-like convex section 31 is disposed at a position facing a light irradiation section 10B to be described later (see FIG. 15). At this time, the fluorescent substrate 1 may further include, for example, a thermally-conductive material 32, as illustrated in FIG. 4. The thermally-conductive material 32 only comes in contact with the substrate 20 and the fluorescent layer 10 inside an opening of the ring-like convex section 31, and has no function of joining the substrate 20 and the fluorescent layer 10 with each other. The thermally-conductive material 32 is, for example, a thermally-conductive grease, a thermally-conductive filler mixture paste, a thermally-conductive sheet, or any other equivalent material. The fluorescent substrate 1 may further include, for example, one or more fixing layers 33 inside the opening of the ring-like convex section 31, as illustrated in FIG. 5. The one or more fixing layers 33 serve to fix the substrate 20 and the fluorescent layer 10 to each other, and include, for example, a material in common with the fixing layer 30.

Figure 6A:
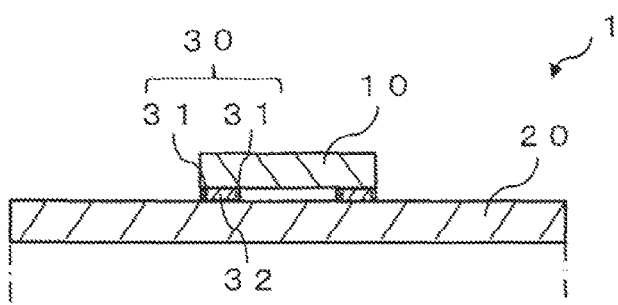
FIGS. 6(A) and 6(B) are diagrams illustrating one modification example of a cross-sectional configuration and a planar configuration of the fluorescent substrate illustrated in FIGS. 1(A) and 1(B).
Figure 6B:
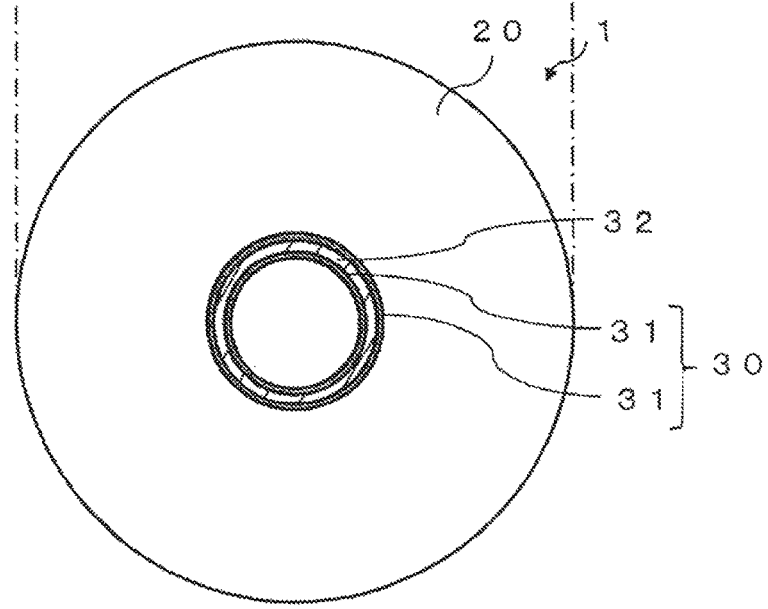

For example, the fixing layer 30 may have two ring-like convex sections 31 at a position facing the outer edge of the fluorescent layer 10, as illustrated in FIGS. 6(A) and 6(B). The two ring-like convex sections 31 are disposed to avoid a region facing the light irradiation section 10B. The two ring-like convex sections 31 are disposed in a concentric manner with each other. One of the ring-like convex sections 31 is disposed on an outer circumferential edge of the region facing the light irradiation section 10B. The other ring-like convex section 31 is disposed on an inner circumferential edge of the region facing the light irradiation section 10B. At this time, the fluorescent substrate 1 may further include the thermally-conductive material 32 inside a clearance between the two ring-like convex sections 31. At this time, the thermally-conductive material 32 is disposed to face the light irradiation section 10B.

FIG. 7 illustrates a cross-sectional configuration example of the fluorescent substrate 1, the attachment 42, and the shaft 41 of the motor in a case where the shaft 41 is mounted on the fluorescent substrate 1 with the attachment 42 in between. It is to be noted that FIG. 7 exemplifies how the shaft 41 of the motor is mounted on the fluorescent substrate 1 illustrated in FIGS. 1(A) and 1(B) with the attachment 42 in between.

The attachment 42 serves to couple the fluorescent substrate 1 and a leading end of the shaft 41 of the motor to each other. The attachment 42 is configured in a rotatable manner, and is rotationally symmetric, for example. In a case where the attachment 42 is mounted on the shaft 41, the attachment 42 is, for example, in a shape rotationally symmetric about the rotation axis AX1 of the shaft 41. The attachment 42 is fixed to the substrate 20 so as to avoid a portion directly underneath the fluorescent layer 10 of the substrate 20. The attachment 42 is, for example, in a circular disk shape, and has a concave portion 42A in a center of the circular disk, and a plurality of openings 42B for insertion of screws 43 therethrough on an outer edge of the circular disk. In a case where the attachment 42 is mounted on the substrate 20, the substrate 20 has an opening 21 at a location corresponding to each of the openings 42B. The attachment 42 is fixed to the substrate 20 by insertion of the screws 43 into the openings 42B and the openings 21.

(Light Source Device 2)

Next, description is given of the light source device 2 that includes the above-described fluorescent substrate 1. FIG. 8 illustrates a simplified configuration example of the light source device 2 using the above-described fluorescent substrate 1. The light source device 2 applies the above-described fluorescent substrate 1 to the light converter 2A. Specifically, the light source device 2 includes the light converter 2A and a light source section 2B.

The light source section 2B serves to irradiate the light converter 2A with excitation light L1. The light source section 2B corresponds to a specific example of a "light source" in the present disclosure. The light source section 2B has, for example, two light sources 111, light-collecting mirrors 112, 113, and 114, and a dichroic mirror 115. Each of the light sources 111 emits light (the excitation light L1) having a peak wavelength of emission intensity within a wavelength range suitable to excite the fluorescent layer 10. It is assumed that the fluorescent layer 10 contains a fluorescent material that is excited by light (blue light) having a wavelength within a wavelength range of 400 nm to 500 nm both inclusive to emit yellow fluorescent light. In such a case, each of the light sources 111 includes, for example, a semiconductor laser or a light-emitting diode that emits, as the excitation light L1, the blue light having the peak wavelength of the emission intensity within the wavelength range of 400 nm to 500 nm both inclusive.

The light-collecting mirrors 112 and 113 are, for example, concave reflecting mirrors. The light-collecting mirrors 112 and 113 reflect the light (the excitation light L1) emitted from the two light sources 111 toward the light-collecting mirror 114, and focus such light. The light-collecting mirror 114 is, for example, a convex reflecting mirror, and aligns reflected light from the light-collecting mirrors 112 and 113 to substantially parallel light to reflect the resultant light toward the fluorescent layer 10.

The dichroic mirror 115 selectively reflects color light in a predetermined wavelength region, and transmits light in a wavelength region other than the predetermined wavelength region. The dichroic mirror 115 allows the light (the excitation light L1) emitted from the two light sources 111 to pass therethrough, and reflects the light (fluorescent light L2) emitted from the fluorescent layer 10. Further, the dichroic mirror 115 allows light L3 emitted from a light source 117 to be described later to pass therethrough. Here, a traveling direction of the fluorescent light L2 reflected by the dichroic mirror 115 and a traveling direction of the light L3 are coincident with each other. Therefore, the dichroic mirror 115 mixes the fluorescent light L2 and the light L3 with each other to output thus-mixed light toward a predetermined direction. The light L3 is light having a peak wavelength of emission intensity within a wavelength range in common with the excitation light L1. In a case where the excitation light L1 is the blue light having the peak wavelength of the emission intensity within the wavelength range of 400 nm to 500 nm both inclusive, the light L3 is also the blue light having the peak wavelength of the emission intensity within the wavelength range of 400 nm to 500 nm both inclusive.

The light source section 2B also serves to generate the light L3 that allows for generation of white light Lw through mixture with light (fluorescent light L2) outputted from the light converter 2A. The light source section 2B further includes, for example, one light source 117 and a light-collecting mirror 116. The light source 117 emits the light L3. The light source 117 includes a semiconductor laser or a light-emitting diode that emits the light L3. The light-collecting mirror 116 focuses mixed light (the white light Lw) that is generated by the dichroic mirror 115 to output the thus-focused mixed light toward another optical system.

The light converter 2A serves to output the fluorescent light L2 having a peak of emission intensity within a wavelength range that is different from the wavelength range of the excitation light L1. The light converter 2A uses the light emitted from the light source section 2B as the excitation light L1 to output the fluorescent light L2 to the light source section 2B. The light converter 2A has the fluorescent substrate 1, a motor 121 that is coupled to the fluorescent substrate 1 with the attachment 42 in between, and a light-collecting lens 122 that is disposed at a position facing a top surface of the fluorescent substrate 1 with a predetermined clearance in between. The light-collecting lens 122 serves to focus the excitation light L1 incoming from the light source section 2B to irradiate a predetermined position on the fluorescent layer 10 with the excitation light L1. The light-collecting lens 122 includes, for example, a lens 122a and a lens 122b.

Each of FIGS. 9, 10, and 11 illustrates an example of irradiation of the fluorescent substrate 1 with the excitation light L1 in the light source device 2. The light-collecting lens 122 is so configured that an outer edge of the top surface of the fluorescent layer 10 is irradiated with the excitation light L1 focused by the light-collecting lens 122. Here, in a case where the fluorescent layer 10 does not rotate, a portion to be irradiated with the excitation light L1 on the fluorescent layer 10 is called a light irradiation point 10A. In a case where the fluorescent layer 10 is irradiated with the excitation light L1, the fluorescent layer 10 rotates about the rotation axis AX1 along with the substrate 20; therefore, while the fluorescent layer 10 is rotating, the outer edge of the top surface of the fluorescent layer 10 is irradiated with the excitation light L1 in a circular pattern. Accordingly, while the fluorescent layer 10 is rotating, the light irradiation point 10A moves on the outer edge of the top surface of the fluorescent layer 10. It is to be noted that the light irradiation region 10B illustrated in FIG. 11 corresponds to a ring-like region where the light irradiation point 10A passes through on the top surface of the fluorescent layer 10.

Meanwhile, it is assumed that an energy distribution of the excitation light L1 exhibits Gaussian distribution. In such a case, a beam diameter of the excitation light L1 is equivalent to a diameter of a bundle of rays having intensity of $1/e^2$ (=13.5%) or more of center intensity. Here, a diameter of the light irradiation point 10A is assumed to be equal to the beam diameter of the excitation light L1. At this time, a line width of the light irradiation region 10B is equal to diameter of the light irradiation point 10A, resulting in the line width of the light irradiation region 10B being equal to the beam diameter of the excitation light L1.

Here, 99.9% or more of total energy of the excitation light L1 exists in a bundle of rays with a diameter of 1.52 times larger than the beam diameter of the excitation light L1. Therefore, the light-collecting lens 122 is preferably disposed so as to allow the top surface of the fluorescent layer 10 to be irradiated with the bundle of rays with the diameter of 1.52 times larger than the beam diameter of the excitation light L1 (the diameter of the light irradiation point 10A). The beam diameter of the excitation light L1 (the diameter of the light irradiation point 10A) is assumed to be 3 mm in terms of light conversion efficiency or any other factor. At this time, the light-collecting lens 122 is preferably disposed so as to allow a center of the light irradiation point 10A to be located at a position away from an end edge of the top surface of the fluorescent layer 10 by 2.28 mm (=3 mm×1.52/2) or longer.

It is to be noted that the light-collecting lens 122 may be disposed so as to allow the center of the light irradiation point 10A to be located at a position away from the end edge of the top surface of the fluorescent layer 10 by 2.28 mm (=3 mm×1.52/2). At this time, a band-like region (a region α) between the end edge of the top surface of the fluorescent layer 10 and a position away from the end edge of the top surface of the fluorescent layer 10 by 4.56 mm (=2.28 mm×2) is irradiated with the bundle of rays with the diameter of 1.52 times larger than the beam diameter of the excitation light L1 (the diameter of the light irradiation point 10A). Therefore, in this case, the ring-like convex section 31 illustrated in FIG. 9 is preferably disposed directly underneath the region α. Further, the thermally-conductive material 32 illustrated in FIG. 10 is preferably disposed directly underneath the region α.

[Effects]

Next, description is given of effects of the fluorescent substrate 1 and the light source device 2 of the present embodiment.

In general, a phenomenon called luminance saturation or temperature quenching is present in light emission of a fluorescent layer. This is the phenomenon in which a portion of conversion loss in the fluorescent layer is changed into heat to cause the fluorescent layer to produce heat in a case where an output of the excitation light is raised, resulting in deterioration in the fluorescence conversion efficiency. In a state of the low fluorescence conversion efficiency, it is not possible to achieve a bright and efficient light source device. Therefore, the fluorescent layer is provided on a surface of a substrate having high thermal conductivity.

Meanwhile, the fluorescent layer and the substrate on which the fluorescent layer is provided may be fixed to each other with an adhesive layer or any other adhesive material in between, or may be directly fixed to each other using normal-temperature bonding, optical contact, or any other equivalent technique. Consequently, warpage may occur in the substrate due to a stress caused by thermal expansion arising in each of the fluorescent layer and the substrate, and the fluorescence conversion efficiency may deteriorate in a case where displacement of a focal position of excitation light occurs.

In the present embodiment, however, the fluorescent layer 10 is disposed in the center of the substrate 20. Accordingly, even if the warpage occurs in the substrate 20 due to a stress caused by thermal expansion arising in each of the fluorescent layer 10 and the substrate 20, it is possible to reduce an amount of displacement of the fluorescent layer 10 as compared with a case where the fluorescent layer is disposed on the outer edge of the substrate or over the entire surface of the substrate. As a result, it is possible to reduce displacement of the focal position that is caused by the thermal expansion.

Further, in the present embodiment, a portion of the surface on the side on which the fluorescent layer 10 is located of the substrate 20 and a portion of the surface on the side on which the substrate 20 is located of the fluorescent layer 10 are fixed to each other by the fixing layer 30. This makes it possible to reduce the amount of displacement of the fluorescent layer 10 as compared with a case where the entire surface on the side on which the fluorescent layer is located of the substrate and the entire surface on the side on which the substrate is located of the fluorescent layer are fixed to each other by the fixing layer. As a result, it is possible to reduce displacement of the focal position that is caused by the thermal expansion.

In addition, in the present embodiment, in a case where the substrate 20 and the fluorescent layer 10 include materials ensuring that a difference in a linear expansion coefficient between the substrate 20 and the fluorescent layer 10 is equal to or less than $1 \times 10^{-6}$ cm/degree centigrade, it is possible to reduce the amount of displacement of the fluorescent layer 10 as compared with a case where the substrate and the fluorescent layer include materials that cause a difference in a linear expansion coefficient between the substrate and the fluorescent layer to exceed $1 \times 10^{-6}$ cm/degree centigrade. As a result, it is possible to reduce displacement of the focal position that is caused by the thermal expansion.

Moreover, in the present embodiment, in a case where the ring-like convex section 31 is disposed at a position facing the light irradiation region 10B, in the event of heat generation in the outer edge of the top surface of the fluorescent layer 10 by irradiation with the excitation light L1, it is possible to transfer the heat to the substrate 20 efficiently through the ring-like convex section 31. This improves the luminescence conversion efficiency, which makes it possible to achieve the bright and efficient light source device 2.

Further, in the present embodiment, in a case where the thermally-conductive material 32 is disposed at a position facing the light irradiation region 10B, in the event of heat generation in the outer edge of the top surface of the fluorescent layer 10 by irradiation with the excitation light L1, it is possible to transfer the heat to the substrate 20 efficiently through the thermally-conductive material 32. This improves the luminescence conversion efficiency, which makes it possible to achieve the bright and efficient light source device 2.

Hereinafter, description is given of other embodiments of the present disclosure. It is to be noted that, in the following, components in common with those of the fluorescent substrate 1 of the above-described embodiment are denoted with the same reference numerals. Further, description of the components in common with those of the fluorescent substrate 1 of the above-described embodiment is omitted as appropriate.

2. Second Embodiment

Figure 12A:
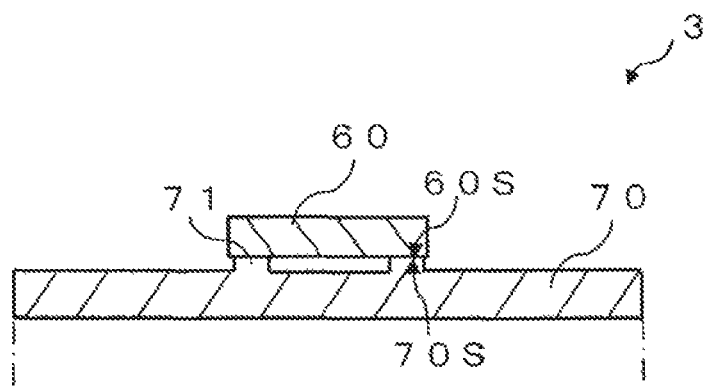
FIGS. 12(A) and 12(B) are diagrams illustrating a cross-sectional configuration example and a planar configuration example of a fluorescent substrate according to a second embodiment of the present disclosure.
Figure 12B:
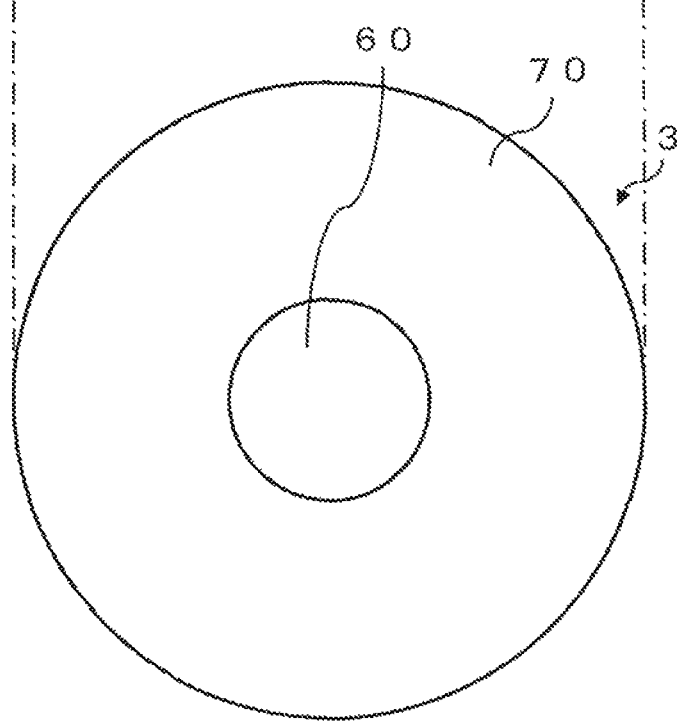

Next, description is given of a fluorescent substrate 3 according to a second embodiment of the present disclosure. The fluorescent substrate 3 corresponds to a specific example of a "fluorescent substrate" in the present disclosure. FIGS. 12(A) and 12(B) illustrate a cross-sectional configuration example and a planar configuration example of the fluorescent substrate 3 according to the second embodiment of the present disclosure. The fluorescent substrate 3 is applicable to, for example, a light converter 4A of a light source device 4 to be described later (see FIG. 15). The fluorescent substrate 3 includes a substrate 70 and a fluorescent layer 60.

FIG. 13 illustrates an example of a planar configuration of the substrate 70. The substrate 70 is configured in a rotatable manner, and is rotationally symmetric, for example. In a case where the substrate 70 is mounted on a shaft 41 with the attachment 42 in between, the substrate 70 is, for example, in a shape rotationally symmetric about the rotation axis AX1 of the shaft 41 to be described later. The substrate 70 is, for example, in a circular disk shape. The substrate 70 includes a material having high thermal conductivity, and includes, for example, any of materials such as a metal/alloy-based material, a ceramic-based material, a ceramic/metal mixture-based material, crystals including sapphire, diamond, or glass. Here, examples of the metal/alloy-based material include Al, Cu, Mo, W, and CuW. Examples of the ceramic-based material include SiC, AlN, $Al_2O_3$, $Si_3N_4$, $ZrO_2$, and $Y_2O_3$. Examples of the ceramic/metal mixture-based material include SiC—Al, SiC—Mg, and SiC—Si.

A diameter of the substrate 70 is, for example, at least 20 mm but no more than 100 mm. A thickness of the substrate 70 is, for example, at least 0.3 mm but no more than 2.0 mm. The substrate 70 may be configured in a single layer, or may be configured in a plurality of layers. In a case where the substrate 70 is configured in the single layer, the substrate 70 preferably includes a material having high reflectance. In a case where the substrate 70 is configured in the plurality of layers, a layer that configures a top surface of the substrate 70 preferably includes a material having high reflectance.

The substrate 70 has a ring-like convex section 71 at a position facing an outer edge of the fluorescent layer 60. A top surface of the convex section 71 serves as a junction surface 70S that joins a portion of a surface on the side on which the fluorescent layer 60 is located of the substrate 70 and a portion of a surface on the side on which the substrate 70 is located of the fluorescent layer 60 with each other. In other words, the substrate 70 has a junction layer 70S in a surface on the side on which the fluorescent layer 60 is located. The junction surface 70S is joined with the fluorescent layer 60 (a junction surface 60S of the fluorescent layer 60) with use of the normal-temperature bonding or optical contact.

There are surface-activated bonding and atomic diffusion bonding as the normal-temperature bonding. The surface-activated bonding refers to a bonding method in which two substances are joined without adding an adhesive agent, heat, or pressure, etc. through activating junction surfaces of the substances by surface treatment in vacuum. The junction surfaces of the substances are activated by removing oxides and impurities that are present on the junction surfaces of the substances with use of argon sputtering or any other technique. The atomic diffusion bonding refers to a bonding method in which two substances are joined at normal temperature under no-pressure and no-voltage condition through forming fine crystalline films on the junction surfaces of the substances under ultrahigh vacuum condition and overlapping two thin films with each other in vacuum condition. The optical contact refers to a bonding method in which finely-polished planes are attached closely to each other to cause interaction between molecules on the planes, thereby stabilizing the molecules on the planes as with internal molecules.

The fluorescent layer 60 is disposed in the center of the substrate 70. For example, the fluorescent layer 60 is in a circular disk shape, and is disposed in a concentric manner with the substrate 70. At the time of entry of light of a specified wavelength, the fluorescent layer 60 is excited by the light of the specified wavelength (incident light) to emit light in a wavelength region that is different from the wavelength of the incident light. The fluorescent layer 60 includes, for example, a fluorescent material that is excited by blue light having a center wavelength of about 445 nm to emit yellow fluorescent light (yellow light). For example, at the time of entry of the blue light, the fluorescent layer 60 converts a portion of the blue light into the yellow light. Examples of the fluorescent material contained in the fluorescent layer 60 include a YAG-based fluorescent body (for example, $Y_3Al_5O_{12}$). The YAG-based fluorescent body is one of the fluorescent materials that are excited by the blue light having the center wavelength of about 445 nm to emit the yellow fluorescent light (the yellow light). In a case where the fluorescent material contained in the fluorescent layer 60 is the YAG-based fluorescent body, the YAG-based fluorescent body may be doped with Ce.

The fluorescent layer 60 may include an oxide fluorescent body other than the YAG-based fluorescent body. As an alternative, the fluorescent layer 60 may include a fluorescent body other than the oxide fluorescent body, and may include, for example, an oxynitride fluorescent body, a nitride-based fluorescent body, a sulfide fluorescent body, or a silicate-based fluorescent body.

The •BR>@ fluorescent layer 60 includes a particulate fluorescent body and a binder that holds the particulate fluorescent body. The fluorescent layer 60 may include, for example, the particulate fluorescent body and a material that is formed by solidifying the particulate fluorescent body with an inorganic material. The fluorescent layer 60 may be formed, for example, by applying, onto the substrate 70, a material containing the particulate fluorescent body and the binder that holds the particulate fluorescent body. The fluorescent layer 60 may be formed, for example, by sintering a material containing the particulate fluorescent body and the binder (for example, a ceramic material) that holds the particulate fluorescent body. It is to be noted that the particulate fluorescent body contained in the fluorescent layer 60 is, for example, any of the various fluorescent bodies as described above. The fluorescent layer 60 may be a polycrystalline plate including a fluorescent material. The polycrystalline plate is formed by processing a polycrystalline material including the fluorescent material in a plate-like shape.

The substrate 70 and the fluorescent layer 60 preferably include materials ensuring that a difference in a linear expansion coefficient between the substrate 70 and the fluorescent layer 60 is equal to or less than $1 \times 10^{-6}$ cm/degree centigrade per meter. In a case where the fluorescent layer 60 is the polycrystalline plate that includes the Ce-doped YAG-based fluorescent body, the linear expansion coefficient of the fluorescent layer 60 is about $8.0 \times 10^{-6}$ m/degree centigrade per meter. In a case where the substrate 70 includes a titanium alloy, the linear expansion coefficient of the substrate 70 is about $8.4 \times 10^{-6}$ m/degree centigrade per meter. Therefore, in a case where the fluorescent layer 60 is the polycrystalline plate that includes the Ce-doped YAG-based fluorescent body, and the substrate 70 includes the titanium alloy, the difference in the linear expansion coefficient between the substrate 70 and the fluorescent layer 60 is $0.4 \times 10^{-6}$ cm/degree centigrade per meter. That is, in a case where the fluorescent layer 60 is the polycrystalline plate that includes a ceramic material, and the substrate 70 includes the titanium alloy, the difference in the linear expansion coefficient between the substrate 70 and the fluorescent layer 60 is equal to or less than $1 \times 10^{-6}$ cm/degree centigrade per meter.

The substrate 70 may include a material having a large linear expansion coefficient, such as aluminum ($23 \times 10^{-6}$ cm/degree centigrade per meter), stainless steel ($17 \times 10^{-6}$ cm/degree centigrade per meter), or copper ($17 \times 10^{-6}$ cm/degree centigrade per meter), for example. In this case, however, the difference in the linear expansion coefficient between the substrate 70 and the fluorescent layer 60 is a significantly greater value than $1 \times 10^{-6}$ cm/degree centigrade per meter.

A diameter of the fluorescent layer 60 is, for example, at least 3 mm but no more than 60 mm. In a case where the diameter of the substrate 70 is 20 mm, the diameter of the fluorescent layer 60 is, for example, 3 mm. In a case where the diameter of the substrate 70 is 100 mm, the diameter of the fluorescent layer 60 is, for example, 60 mm. The fluorescent layer 60 may be configured in a single layer, or may be configured in a plurality of layers. In a case where the fluorescent layer 60 is configured in the plurality of layers, a layer that configures a surface (an undersurface) of the fluorescent layer 60 on the side on which the substrate 70 is located may include a material having high reflectance.

For example, the fluorescent substrate 3 may further include a heat dissipator 50 that includes a material having relatively high thermal conductivity on a rear surface of the substrate 70 (on a surface of the substrate 70 on the opposite side of the fluorescent layer 60).

FIG. 14 illustrates a cross-sectional configuration example of the fluorescent substrate 3, the attachment 42, and the shaft 41 of the motor in a case where the shaft 41 is mounted on the fluorescent substrate 3 with the attachment 42 in between. It is to be noted that FIG. 14 exemplifies how the shaft 41 of the motor is mounted on the fluorescent substrate 3 illustrated in FIGS. 12(A) and 12(B) with the attachment 42 in between.

The attachment 42 serves to couple the fluorescent substrate 3 and a leading end of the shaft 41 of the motor to each other. The attachment 42 is configured in a rotatable manner, and is rotationally symmetric, for example. In a case where the attachment 42 is mounted on the shaft 41, the attachment 42 is, for example, in a shape rotationally symmetric about the rotation axis AX1 of the shaft 41. The attachment 42 is fixed to the substrate 70 so as to avoid a portion directly underneath the fluorescent layer 60 of the substrate 70. The attachment 42 is, for example, in a circular disk shape, and has the concave portion 42A in a center of the circular disk, and a plurality of openings 42B for insertion of the screws 43 therethrough on an outer edge of the circular disk. In a case where the attachment 42 is mounted on the substrate 70, the substrate 70 has an opening 72 at a location corresponding to each of the openings 42B. The attachment 42 is fixed to the substrate 70 by insertion of the screws 43 into the openings 42B and the openings 72.

(Light Source Device 4)

Next, description is given of the light source device 4 that includes the above-described fluorescent substrate 3. FIG. 15 illustrates a simplified configuration example of the light source device 4 using the above-described fluorescent substrate 3. The light source device 4 applies the above-described fluorescent substrate 3 to the light converter 4A. Specifically, the light source device 4 includes the light converter 4A and a light source section 2B. The light source section 2B serves to irradiate the light converter 4A with the excitation light L1. The light source section 2B corresponds to a specific example of a "light source" in the present disclosure.

The light converter 4A serves to output the fluorescent light L2 having a peak of the emission intensity within the wavelength range that is different from the wavelength range of the excitation light L1. The light converter 4A uses the light emitted from the light source section 2B as the excitation light L1 to output the fluorescent light L2 to the light source section 2B. The light converter 4A has the fluorescent substrate 3 as an alternative of the fluorescent substrate 1 in the light converter 2A.

Each of FIGS. 16 and 17 illustrates an example of irradiation of the fluorescent substrate 3 with the excitation light L1 in the light source device 4. The light-collecting lens 122 is so configured that an outer edge of the top surface of the fluorescent layer 60 is irradiated with the excitation light L1 focused by the light-collecting lens 122. Here, in a case where the fluorescent layer 60 does not rotate, a portion to be irradiated with the excitation light L1 on the fluorescent layer 60 is called a light irradiation point 60A. In a case where the fluorescent layer 60 is irradiated with the excitation light L1, the fluorescent layer 60 rotates about the rotation axis AX1 along with the substrate 70; therefore, while the fluorescent layer 60 is rotating, the outer edge of the top surface of the fluorescent layer 60 is irradiated with the excitation light L1 in a circular pattern. Accordingly, while the fluorescent layer 60 is rotating, the light irradiation point 60A moves on the outer edge of the top surface of the fluorescent layer 60. It is to be noted that a light irradiation region 60B illustrated in FIG. 17 corresponds to a ring-like region where the light irradiation point 60A passes through on the top surface of the fluorescent layer 60.

Meanwhile, it is assumed that the energy distribution of the excitation light L1 exhibits Gaussian distribution. In such a case, the beam diameter of the excitation light L1 is equivalent to a diameter of a bundle of rays having the intensity of $1/e^2$ (=13.5%) or more of the center intensity. Here, a diameter of the light irradiation point 60A is assumed to be equal to the beam diameter of the excitation light L1. At this time, a line width of the light irradiation region 60B is equal to the diameter of the light irradiation point 60A, resulting in the line width of the light irradiation region 10B being equal to the beam diameter of the excitation light L1.

Here, 99.9% or more of total energy of the excitation light L1 exists in a bundle of rays with a diameter of 1.52 times larger than the beam diameter of the excitation light L1. Therefore, the light-collecting lens 122 is preferably disposed so as to allow the top surface of the fluorescent layer 60 to be irradiated with the bundle of rays with the diameter of 1.52 times larger than the beam diameter of the excitation light L1 (the diameter of the light irradiation point 60A). The beam diameter of the excitation light L1 (the diameter of the light irradiation point 60A) is assumed to be 3 mm in terms of light conversion efficiency or any other factor. At this time, the light-collecting lens 122 is preferably disposed so as to allow a center of the light irradiation point 60A to be located at a position away from an end edge of the top surface of the fluorescent layer 60 by 2.28 mm (=3 mm×1.52/2) or longer.

It is to be noted that the light-collecting lens 122 may be disposed so as to allow the center of the light irradiation point 60A to be located at a position away from the end edge of the top surface of the fluorescent layer 60 by 2.28 mm (=3 mm×1.52/2). At this time, a band-like region (a region β) between the end edge of the top surface of the fluorescent layer 60 and a position away from the end edge of the top surface of the fluorescent layer 60 by 4.56 mm (=2.28 mm×2) is irradiated with the bundle of rays with the diameter of 1.52 times larger than the beam diameter of the excitation light L1 (the diameter of the light irradiation point 60A). Therefore, in this case, the convex section 71 is preferably disposed directly underneath the region β.

[Effects]

Next, description is given of effects of the fluorescent substrate 3 and the light source device 4 of the present embodiment.

In the present embodiment, the fluorescent layer 60 is disposed in the center of the substrate 70. Accordingly, even if warpage occurs in the substrate 70 due to a stress caused by thermal expansion arising in each of the fluorescent layer 60 and the substrate 70, it is possible to reduce an amount of displacement of the fluorescent layer 60 as compared with a case where the fluorescent layer is disposed on the outer edge of the substrate or over the entire surface of the substrate. As a result, it is possible to reduce displacement of the focal position that is caused by the thermal expansion.

Further, in the present embodiment, the substrate 70 is provided with the junction surface 70S that joins a portion of the surface on the side on which the fluorescent layer 60 is located of the substrate 70 and a portion of the surface on the side on which the substrate 70 is located of the fluorescent layer 60 with each other. This makes it possible to reduce the amount of displacement of the fluorescent layer 60 as compared with a case where the entire surface on the side on which the fluorescent layer is located of the substrate and the entire surface on the side on which the substrate is located of the fluorescent layer are joined with each other. As a result, it is possible to reduce displacement of the focal position that is caused by the thermal expansion.

In addition, in the present embodiment, in a case where the substrate 70 and the fluorescent layer 60 include materials ensuring that a difference in a linear expansion coefficient between the substrate 70 and the fluorescent layer 60 is equal to or less than $1 \times 10^{-6}$ cm/degree centigrade, it is possible to reduce the amount of displacement of the fluorescent layer 60 as compared with a case where the substrate and the fluorescent layer include materials that cause a difference in a linear expansion coefficient between the substrate and the fluorescent layer to exceed $1 \times 10^{-6}$ cm/degree centigrade. As a result, it is possible to reduce displacement of the focal position that is caused by the thermal expansion.

Moreover, in the present embodiment, the junction surface 70S is disposed at a position facing the light irradiation region 60B, which makes it possible to efficiently transfer the heat to the substrate 70 through the junction surface 70S in the event of heat generation in the outer edge of the top surface of the fluorescent layer 60 by irradiation with the excitation light L1. At this time, no layer acting as thermal resistance like the above-described fixing layer 30 exists between the fluorescent layer 60 and the substrate 60. Therefore, in the present embodiment, the thermal resistance between the fluorescent layer 60 and the substrate 60 is smaller as compared with the above-described embodiment, which makes it possible to efficiently transfer the heat arising in the fluorescent layer 60 to the substrate 70 through the junction surface 70S. This improves the luminescence conversion efficiency, which makes it possible to achieve the bright and efficient light source device 4.

3. Modification Example of Second Embodiment

Figure 18A:
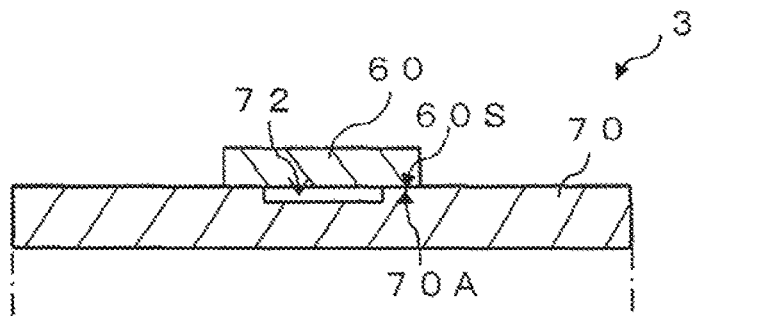
FIG. 18(A) is a diagram illustrating one modification example of a cross-sectional configuration of the fluorescent substrate illustrated in FIGS. 12(A) and 12(B)
Figure 18B:
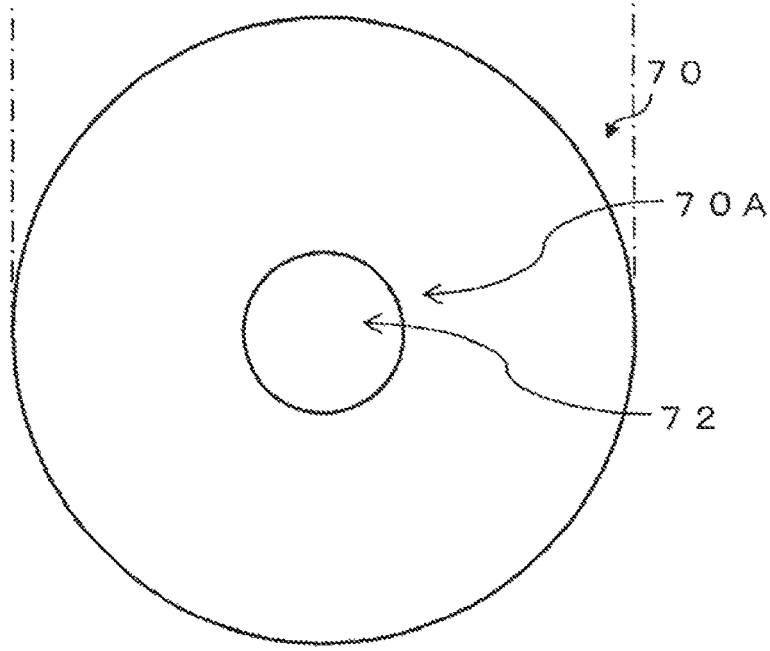
FIG. 18(B) is a diagram illustrating one example of a planar configuration of the substrate illustrated in FIG. 18(A).

FIG. 18(A) illustrates a modification example of a cross-sectional configuration of the fluorescent substrate 3 according to the second embodiment of the present disclosure. FIG. 18(B) illustrates an example of a top configuration of the substrate 70 illustrated in FIG. 18(A). In the present modification example, the substrate 70 has a concave section 72 as an alternative of the convex section 71. The concave section 72 is disposed at a position facing a central portion of the fluorescent layer 60 on the substrate 70. In other words, the substrate 70 has the concave section 72 at a position excluding a position facing the outer edge of the fluorescent layer 60 of a region facing the fluorescent layer 60. A portion corresponding to a circumferential edge of the concave section 72 of the top surface of the substrate 70 has a function as the convex section 71 in the above-describe embodiment. In other words, the portion corresponding to the circumferential edge of the concave section 72 of the top surface of the substrate 70 serves as a junction surface 70A.

In the present modification example, the substrate 70 is provided with the junction surface 70S that joins a portion of the surface on the side on which the fluorescent layer 60 is located of the substrate 70 and a portion of the surface on the side on which the substrate 70 is located of the fluorescent layer 60 with each other. This makes it possible to reduce the amount of displacement of the fluorescent layer 60 as compared with a case where the entire surface on the side on which the fluorescent layer is located of the substrate and the entire surface on the side on which the substrate is located of the fluorescent layer are joined with each other. As a result, it is possible to reduce displacement of the focal position that is caused by the thermal expansion.

Further, in the present modification example, the junction surface 70S is disposed at a position facing the light irradiation region 60B, which makes it possible to efficiently transfer the heat to the substrate 70 through the junction surface 70S in the event of heat generation in the outer edge of the top surface of the fluorescent layer 60 by irradiation with the excitation light L1. At this time, no layer acting as thermal resistance like the above-described fixing layer 30 exists between the fluorescent layer 60 and the substrate 60. Therefore, in the present modification example, the thermal resistance between the fluorescent layer 60 and the substrate 60 is smaller as compared with the above-described embodiment, which makes it possible to efficiently transfer the heat arising in the fluorescent layer 60 to the substrate 70 through the junction surface 70S. This improves the luminescence conversion efficiency, which makes it possible to achieve the bright and efficient light source device 4.

4. Third Embodiment

[Configuration]

Figure 19:
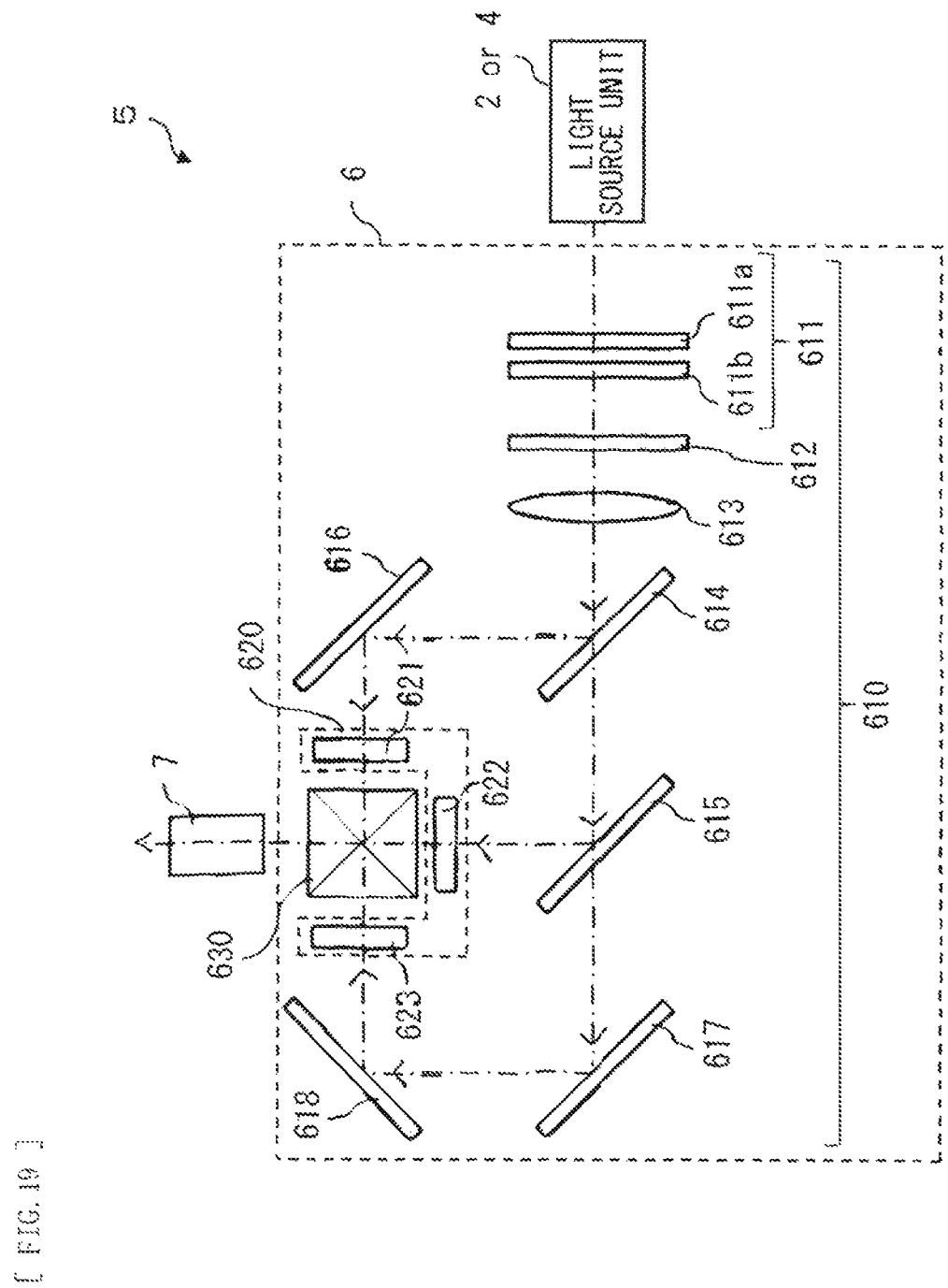
FIG. 19 is a diagram illustrating a simplified configuration example of a projection display unit according to a third embodiment of the present disclosure.

Next, description is given of a projector 5 according to a third embodiment of the present disclosure. The projector 5 corresponds to a specific example of a "projection display unit" in the present disclosure. FIG. 19 illustrates a simplified planar configuration example of the projector 5 according to the third embodiment of the present disclosure. The projector 5 includes the above-described light source device 2 or the above-described light source device 4. The projector 5 further includes an image generation system 6 and a projection optical system 7.

The image generation system 6 generates image light of a plurality of colors by modulating light (white light Lw) emitted from the above-described light source device 2 or the above-described light source device 4 on the basis of an image signal, and synthesizes the generated image light of the plurality of colors to output thus-synthesized image light to the projection optical system 7. The image generation system 6 includes an illumination optical system 610, an image generator 620, and an image synthesizer 630. The projection optical system 7 projects the image light (the synthesized image light) outputted from the image generation system 6 onto a screen or any other viewing surface. The image generation system 6 corresponds to a specific example of a "light modulator" in the present disclosure. The projection optical system 7 corresponds to a specific example of a "projector" in the present disclosure.

The illumination optical system 610 splits the light (the white light Lw) emitted from the above-described light source device 2 or the above-described light source device 4 into the light of a plurality of colors. The illumination optical system 610 has, for example, an integrator element 611, a polarization conversion element 612, a light-collecting lens 613, dichroic mirrors 614 and 615, and mirrors 616 to 618. The integrator element 611 has, for example, a fly-eye lens 611a and a fly-eye lens 611b. The fly-eye lens 611a has a plurality of microlenses that are disposed two-dimensionally. The fly-eye lens 611b also has a plurality of microlenses that are disposed two-dimensionally. The fly-eye lens 611a splits the light (the white light Lw) emitted from the above-described light source device 2 or the above-described light source device 4 into a plurality of bundles of rays to form images of the bundles of rays on the respective microlenses in the fly-eye lens 611b. The fly-eye lens 611b functions as a secondary light source, and allows a plurality of parallel light rays having uniform luminance to enter the polarization conversion element 612. The dichroic mirrors 614 and 615 selectively reflect color light in a predetermined wavelength region, and transmit light in a wavelength region other than the predetermined wavelength region. The dichroic mirror 614 selectively reflects red light, for example. The dichroic mirror 615 selectively reflects green light, for example.

The image generator 620 modulates each color light that is split by the illumination optical system 610 on the basis of an image signal corresponding to each color inputted from the outside, and generates the image light of each color. The image generator 620 includes, for example, a light valve 621 for red light, a light valve 622 for green light, and a light valve 623 for blue light. The light valve 621 for red light modulates red light incoming from the illumination optical system 610 on the basis of an image signal corresponding to a red color inputted from the outside, and generates red image light. The light valve 622 for green light modulates green light incoming from the illumination optical system 610 on the basis of an image signal corresponding to a green color inputted from the outside, and generates green image light. The light valve 623 for blue light modulates blue light incoming from the illumination optical system 610 on the basis of an image signal corresponding to a blue color inputted from the outside, and generates blue image light.

The image synthesizer 630 synthesizes the image light of each color that is generated by the image generator 620 to generate color image light.

[Effects]

Next, description is given of effects of the projector 5 according to the present embodiment.

In the present embodiment, the light source device 2 of the above-described embodiment or the light source device 4 of the above-described embodiment is used as a light source. As a result, in the light source device 2 of the above-described embodiment or the light source device 4 of the above-described embodiment, it is possible to reduce displacement of a focal position that is caused by thermal expansion. This makes it possible to suppress decrease in luminance of the color image light to be outputted from the projector 5 to a value lower than a desired value.

The present disclosure has been described by referring to the three embodiments, the present disclosure is not limited to the above-described embodiments, and may be modified in a variety of ways. It is to be noted that the effects described herein are merely illustrative. Effects to be achieved by the present disclosure are not limited to the effects described herein. The present disclosure may have any effects other than the effects described herein.

For example, in any of the above-described respective embodiments, the fluorescent layer 10 is disposed in the center of the substrate 20; however, the fluorescent layer 10 may be provided on an outer edge of the substrate 20. In this case, however, the fluorescent layer 10 is in a ring-like shape.

Further, for example, in the above-described embodiments, description is given of the example in which the present disclosure is applied to the light source for the projector 5. However, it goes without saying that the present disclosure is also applicable to, for example, an illuminating apparatus. Examples of the illuminating apparatus include a spotlight of an automobile, etc.

Further, for example, the present disclosure may be configured as follows.

(1)

A fluorescent substrate including:

a substrate that is configured in a rotatable manner;

a fluorescent layer disposed in a center of the substrate; and a fixing layer that fixes a portion of a surface on side on which the fluorescent layer is located of the substrate and a portion of a surface on side on which the substrate is located of the fluorescent layer to each other.

(2)

The fluorescent substrate according to (1), in which the fixing layer includes an organic adhesive material, an inorganic adhesive material, a low-melting-point glass, or a solder.

(3)

The fluorescent substrate according to (1) or (2), in which each of the substrate and the fluorescent layer is in a circular disk shape, the fluorescent layer is disposed in a concentric manner with the substrate, and the fixing layer is in a ring-like shape, and is provided at a position facing an outer edge of the fluorescent layer.

(4)

The fluorescent substrate according to (3), further including a thermally-conductive material, in which the fixing layer has one ring-like section at a position facing the outer edge of the fluorescent layer, and the thermally-conductive material only comes in contact with the substrate and the fluorescent layer inside an opening of the ring-like section, and has no function of joining the substrate and the fluorescent layer with each other.

(5)

The fluorescent substrate according to (3), further including a thermally-conductive material, in which the fixing layer has two ring-like sections in a concentric manner at a position facing the outer edge of the fluorescent layer, and the thermally-conductive material only comes in contact with the substrate and the fluorescent layer inside a clearance between the two ring-like sections, and has no function of joining the substrate and the fluorescent layer with each other.

(6)

A fluorescent substrate including:

a substrate that is configured in a rotatable manner; and a fluorescent layer disposed in a center of the substrate, in which the substrate has a junction surface that joins a portion of a surface on side on which the fluorescent layer is located of the substrate and a portion of a surface on side on which the substrate is located of the fluorescent layer with each other.

(7)

The fluorescent substrate according to (6), in which the junction surface is joined with the fluorescent layer with use of normal-temperature bonding or optical contact.

(8)

The fluorescent substrate according to (6) or (7), in which the substrate has a ring-like convex section at a position facing an outer edge of the fluorescent layer, and a top surface of the convex section serves as the junction surface.

(9)

The fluorescent substrate according to (6) or (7), in which the substrate has a concave section at a position excluding a position facing an outer edge of the fluorescent layer in a region facing the fluorescent layer, and a portion, corresponding to a circumferential edge of the concave section, of the substrate serves as the junction surface.

(10)

A light source device including:

a substrate that is configured in a rotatable manner;

a fluorescent layer disposed in a center of the substrate;

a fixing layer that fixes a portion of a surface on side on which the fluorescent layer is located of the substrate and a portion of a surface on side on which the substrate is located of the fluorescent layer to each other; and a light source that irradiates the fluorescent layer with excitation light.

(11)

A light source device including:

a substrate that is configured in a rotatable manner;

a fluorescent layer disposed in a center of the substrate; and a light source that irradiates the fluorescent layer with excitation light, in which the substrate has a junction surface that joins a portion of a surface on side on which the fluorescent layer is located of the substrate and a portion of a surface on side on which the substrate is located of the fluorescent layer with each other.

(12)

A projection display unit including:

a substrate that is configured in a rotatable manner;

a rotationally symmetric fluorescent layer disposed in a center of the substrate;

a fixing layer that fixes a portion of a surface on side on which the fluorescent layer is located of the substrate and a portion of a surface on side on which the substrate is located of the fluorescent layer to each other;

a light source that irradiates the fluorescent layer with excitation light;

a light modulator that generates image light by modulating the excitation light emitted from the light source on a basis of an image signal; and a projector that projects the image light generated by the light modulator.

(13)

A projection display unit including:

a substrate that is configured in a rotatable manner;

a rotationally symmetric fluorescent layer disposed in a center of the substrate;

a light source that irradiates the fluorescent layer with excitation light, a light modulator that generates image light by modulating the excitation light emitted from the light source on a basis of an image signal; and a projector that projects the image light generated by the light modulator, in which the substrate has a junction surface that joins a portion of a surface on side on which the fluorescent layer is located of the substrate and a portion of a surface on side on which the substrate is located of the fluorescent layer with each other.

This application claims the priority on the basis of Japanese Patent Application No. 2015-099923 filed on May 15, 2015 with Japan Patent Office, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A fluorescent substrate, comprising:

a substrate that is configured in a rotatable manner;

a fluorescent layer in a center of the substrate; and a fixing layer that fixes a portion of a surface on a side on which the fluorescent layer is located of the substrate and a portion of a surface on a side on which the substrate is located of the fluorescent layer to each other.

2. The fluorescent substrate according to claim 1, wherein the fixing layer includes one of an organic adhesive material, an inorganic adhesive material, a low-melting-point glass, or a solder.

3. The fluorescent substrate according to claim 1, wherein each of the substrate and the fluorescent layer is in a circular disk shape, the fluorescent layer is in a concentric manner with the substrate, and the fixing layer is in a ring-like shape, and is at a position facing an outer edge of the fluorescent layer.

4. The fluorescent substrate according to claim 3, further comprising a thermally-conductive material, wherein the fixing layer has one ring-like section at a position facing the outer edge of the fluorescent layer, and the thermally-conductive material only comes in contact with the substrate and the fluorescent layer inside an opening of the ring-like section, and has no function of joining the substrate and the fluorescent layer with each other.

5. The fluorescent substrate according to claim 3, further comprising a thermally-conductive material, wherein the fixing layer has two ring-like sections in a concentric manner at a position facing the outer edge of the fluorescent layer, and the thermally-conductive material only comes in contact with the substrate and the fluorescent layer inside a clearance between the two ring-like sections, and has no function of joining the substrate and the fluorescent layer with each other.

6. A fluorescent substrate, comprising:

a substrate that is configured in a rotatable manner; and a fluorescent layer in a center of the substrate, wherein the substrate has a junction surface that joins a portion of a surface on a side on which the fluorescent layer is located of the substrate and a portion of a surface on a side on which the substrate is located of the fluorescent layer with each other.

7. The fluorescent substrate according to claim 6, wherein the junction surface is joined with the fluorescent layer with use of one of normal-temperature bonding or optical contact.

8. The fluorescent substrate according to claim 6, wherein the substrate has a ring-like convex section at a position facing an outer edge of the fluorescent layer, and
a top surface of the convex section serves as the junction surface.

9. The fluorescent substrate according to claim 6, wherein the substrate has a concave section at a position excluding a position facing an outer edge of the fluorescent layer in a region facing the fluorescent layer, and
a portion, corresponding to a circumferential edge of the concave section, of the substrate serves as the junction surface.

10. A light source device, comprising:
a substrate that is configured in a rotatable manner;
a fluorescent layer in a center of the substrate;
a fixing layer that fixes a portion of a surface on a side on which the fluorescent layer is located of the substrate and a portion of a surface on a side on which the substrate is located of the fluorescent layer to each other; and
a light source that irradiates the fluorescent layer with excitation light.

11. A light source device, comprising:
a substrate that is configured in a rotatable manner;
a fluorescent layer in a center of the substrate; and
a light source that irradiates the fluorescent layer with excitation light, wherein
the substrate has a junction surface that joins a portion of a surface on a side on which the fluorescent layer is located of the substrate and a portion of a surface on a side on which the substrate is located of the fluorescent layer with each other.

12. A projection display unit, comprising:
a substrate that is configured in a rotatable manner;
a rotationally symmetric fluorescent layer in a center of the substrate;
a fixing layer that fixes a portion of a surface on a side on which the fluorescent layer is located of the substrate and a portion of a surface on a side on which the substrate is located of the fluorescent layer to each other;
a light source that irradiates the fluorescent layer with excitation light;
a light modulator that generates image light by modulating the excitation light emitted from the light source on a basis of an image signal; and
a projector that projects the image light generated by the light modulator.

13. A projection display unit, comprising:
a substrate that is configured in a rotatable manner;
a rotationally symmetric fluorescent layer in a center of the substrate;
a light source that irradiates the fluorescent layer with excitation light;
a light modulator that generates image light by modulating the excitation light emitted from the light source on a basis of an image signal; and
a projector that projects the image light generated by the light modulator, wherein
the substrate has a junction surface that joins a portion of a surface on a side on which the fluorescent layer is located of the substrate and a portion of a surface on a side on which the substrate is located of the fluorescent layer with each other.

* * * * *